(12) United States Patent
Molla et al.

(10) Patent No.: US 11,684,917 B2
(45) Date of Patent: Jun. 27, 2023

(54) MICROFLUIDIC TECHNIQUE FOR DETECTION OF MULTI-CONTACT MISCIBILITY

(71) Applicant: SCHLUMBERGER TECHNOLOGY CORPORATION, Sugar Land, TX (US)

(72) Inventors: Shahnawaz Hossain Molla, Watertown, MA (US); John Ratulowski, Edmonton (CA); Farshid Mostowfi, Lexington, MA (US); Jinglin Gao, Edmonton (CA)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 394 days.

(21) Appl. No.: 16/651,181

(22) PCT Filed: Sep. 21, 2018

(86) PCT No.: PCT/US2018/052178
§ 371 (c)(1),
(2) Date: Mar. 26, 2020

(87) PCT Pub. No.: WO2019/067319
PCT Pub. Date: Apr. 4, 2019

(65) Prior Publication Data
US 2020/0290040 A1    Sep. 17, 2020

Related U.S. Application Data

(60) Provisional application No. 62/565,307, filed on Sep. 29, 2017.

(51) Int. Cl.
| | |
|---|---|
| *B01L 3/00* | (2006.01) |
| *G01N 21/85* | (2006.01) |
| *B01F 13/00* | (2006.01) |
| *B01F 5/06* | (2006.01) |
| *B01F 3/04* | (2006.01) |
| *B01F 15/00* | (2006.01) |
| *B01F 23/232* | (2022.01) |
| *B01F 25/433* | (2022.01) |
| *B01F 33/30* | (2022.01) |
| *B01F 35/214* | (2022.01) |
| *B01F 35/21* | (2022.01) |
| *B01F 35/221* | (2022.01) |
| *E21B 43/16* | (2006.01) |
| *E21B 49/08* | (2006.01) |
| *B01F 101/23* | (2022.01) |

(52) U.S. Cl.
CPC ...... *B01L 3/502715* (2013.01); *B01F 23/232* (2022.01); *B01F 25/4331* (2022.01); *B01F 25/4333* (2022.01); *B01F 33/30* (2022.01); *B01F 35/214* (2022.01); *B01F 35/2113* (2022.01); *B01F 35/2213* (2022.01); *G01N 21/85* (2013.01); *B01F 2101/23* (2022.01); *B01L 2300/0627* (2013.01); *B01L 2300/0883* (2013.01); *B01L 2400/0487* (2013.01); *E21B 43/164* (2013.01); *E21B 49/08* (2013.01)

(58) Field of Classification Search
CPC ....... B01L 3/502715; B01L 2300/0627; B01L 2300/0883; B01L 2400/0487; B01F 35/2213; B01F 35/2113; B01F 25/4331; B01F 25/4333; B01F 33/30; B01F 35/214; B01F 23/232; B01F 2101/23; G01N 21/85; E21B 43/164; E21B 49/08
See application file for complete search history.

(56) References Cited

U.S. PATENT DOCUMENTS

| | | | |
|---|---|---|---|
| 8,143,990 B2 | 3/2012 | Kowalik | |
| 2010/0017135 A1 | 1/2010 | Mostowfi | |
| 2013/0171628 A1 | 7/2013 | Di Carlo et al. | |
| 2014/0099722 A1* | 4/2014 | Boudot | B01L 3/502746 436/55 |
| 2014/0116881 A1 | 5/2014 | Chapman et al. | |
| 2015/0060057 A1* | 3/2015 | Hawthorne | E21B 43/25 166/250.01 |
| 2016/0215332 A1 | 7/2016 | Blainey et al. | |

OTHER PUBLICATIONS

Ahmadi, K. and R. T. Johns (2011). "Multiple-Mixing-Cell Method for MMP Calculations." SPE Journal 16(04): 733-742.
Ayirala, S. C. and D. N. Rao (2006). Comparative Evaluation of a New MMP Determination Technique. SPE/DOE Symposium on Improved Oil Recovery. Tulsa, Oklahoma, USA, Society of Petroleum Engineers.
Ayirala, S. C. and D. N. Rao (2011). "Comparative Evaluation of a New Gas/Oil Miscibility-Determination Technique." Journal of Canadian Petroleum Technology 50(9-10): 71-81.
Ayirala, S. C., W. Xu, et al. (2006). "Interfacial behaviour of complex hydrocarbon fluids at elevated pressures and temperatures." Canadian Journal of Chemical Engineering 84(1): 22-32.

(Continued)

*Primary Examiner* — David C Thomas
(74) *Attorney, Agent, or Firm* — Trevor G. Grove

(57) ABSTRACT

A microfluidic apparatus includes a substrate defining a microchannel having inlet and an outlet defining a length of the microchannel. The microchannel has a main channel extending from the inlet to the outlet, and a plurality of side cavities extending from the main channel. The cavities are in fluid communication with the main channel. A method includes introducing a sample into the microchannel through the inlet to fill the entire microchannel, and then introducing a solvent into the microchannel through the inlet at a controlled flow rate and inlet pressure. A developed solvent front then moves along the main channel from the inlet to the outlet while displacing the sample in the main channel. Images of the microchannel are acquired as the front moves, and a miscibility condition is determined based on the images.

9 Claims, 13 Drawing Sheets

(56) References Cited

OTHER PUBLICATIONS

Christiansen, R. L. and H. K. Haines (1987). "Rapid Measurement of Minimum Miscibility Pressure With the Rising-Bubble Apparatus." SPE Reservoir Engineering (Society of Petroleum Engineers) 2(4): 523-527.

Elsharkawy, A. M., F. H. Poettmann, et al. (1992). Measuring Minimum Miscibility Pressure: Slim-Tube or Rising-Bubble Method, SPE/DOE Enhanced Oil Recovery Symposium. Tulsa, Oklahoma, 1992 Copyright 1992, Society of Petroleum Engineers Inc.

Elsharkawy, A. M., F. H. Poettmann, et al. (1996). "Measuring $CO_2$ minimum miscibility pressures: Slim-tube or rising-bubble method?" Energy & Fuels 10(2): 443-449.

Lefortier, S. G. R., P. J. Hamersma, et al. (2012). "Rapid microfluidic screening of $CO_2$ solubility and diffusion in pure and mixed solvents." Lab on a Chip, vol. 12, pp. 3387-3391.

Metcalfe, R. S. and L. Yarborough (1979). "The Effect of Phase Equilibria on the $CO_2$ Displacement Mechanism." Society of Petroleum Engineers Journal 19(4): 242-252.

Nguyen, P., D. Mohaddes, et al. (2015). "Fast Fluorescence-Based Microfluidic Method for Measuring Minimum Miscibility Pressure of $CO_2$ in Crude Oils." Analytical Chemistry 87(6): 3160-3164.

Yellig, W. F. and R. S. Metcalfe (1980). "Determination and Prediction of $CO_2$ Minimum Miscibility Pressures (includes associated paper 8876)." Journal of Petroleum Technology 32(1): 160-168.

International Search Report and Written Opinion issued in International Patent Application No. PCT/US2018/052178 dated Apr. 10, 2019; 12 pages.

International Preliminary Report on Patentability issued in International Patent Application No. PCT/US2018/052178 dated Apr. 9, 2020; 8 pages.

\* cited by examiner

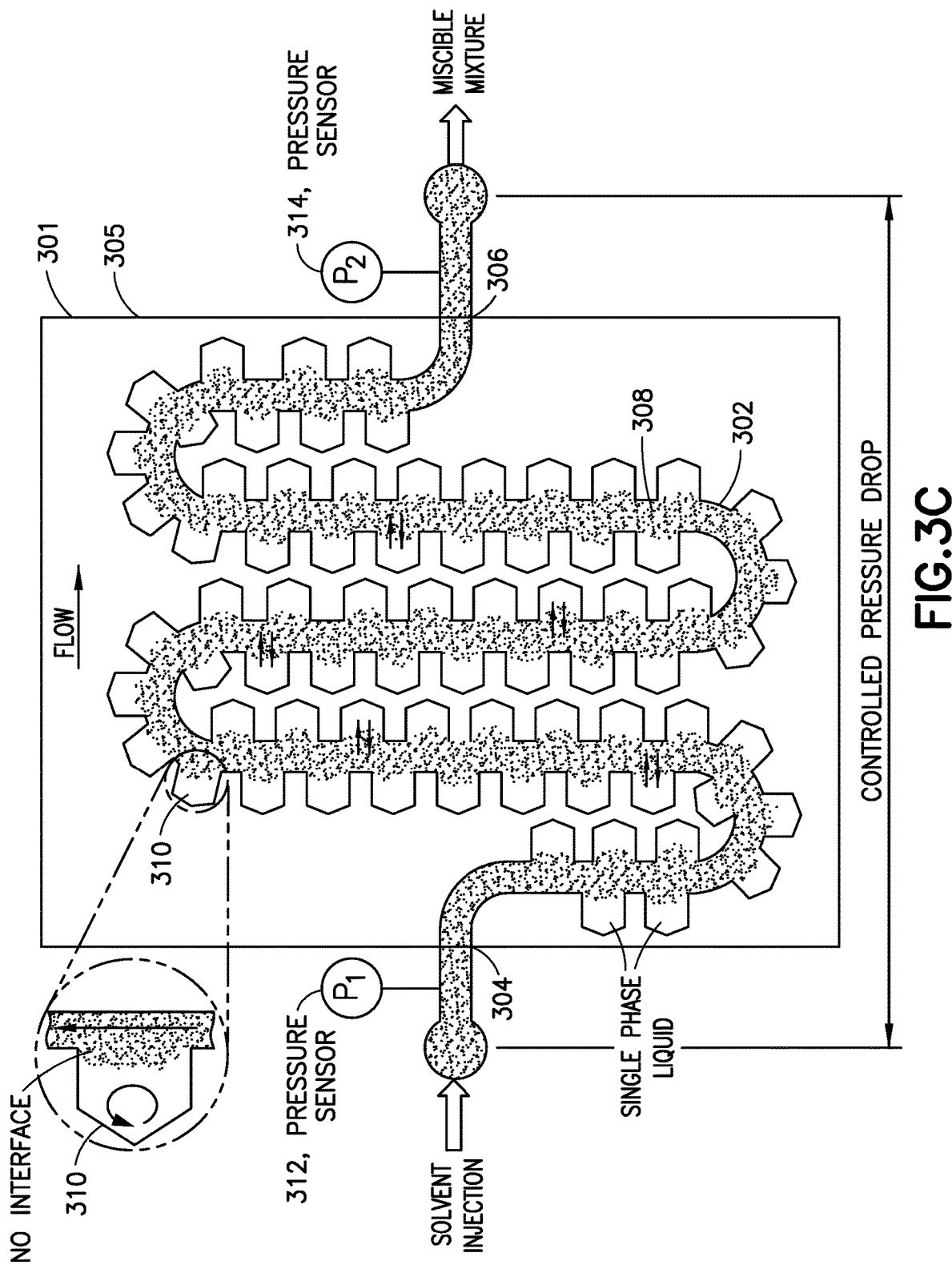

MICROFLUIDIC TECHNIQUE FOR DETECTION OF MULTI-CONTACT MISCIBILITY

CROSS-REFERENCE TO RELATED APPLICATIONS

This application claims the benefit of priority under 35 U.S.C. 119(e) to U.S. Provisional Patent Application No. 62/565,307, filed Sep. 29, 2017, the entire contents of which are incorporated herein by reference.

FIELD

The present disclosure relates to the detection of a miscibility condition in a sample, and in particular, to the measurement of minimum miscibility pressure and/or minimum miscibility enrichment.

BACKGROUND

Gas injection is one of the most commonly used tertiary enhanced oil recovery (EOR) processes. Typical injection gases include carbon dioxide (CO2), light hydrocarbon gases and nitrogen (N2). Injected gas can mobilize oil through a variety of mechanisms including oil swelling, reduction of the oil viscosity and the development of miscibility. When the gas becomes miscible with the oil the interfacial tension (IFT) between the gas and oil vanishes. Oil is then no longer trapped by capillary forces and recovery is significantly enhanced. The conditions at which miscibility is obtained are defined by the composition of the in situ oil, composition of the injected gas, temperature and pressure. In practice, it is possible to control the injection/reservoir pressure and the injected gas composition. Therefore, the injection pressure and injected gas composition at which miscibility is obtained are key design parameters for gas injection EOR processes.

An injected gas can be, what is termed, "first contact miscible" with the reservoir fluid. In the case of first contact miscible miscibility, mixtures of the injected gas and reservoir fluid are miscible in all proportions. The injected gas can also "develop" miscibility with the reservoir fluid through a "multiple contact" process in which components of the injected gas dissolve in the liquid phase of the reservoir fluid (vaporizing gas drive) and/or components of the reservoir fluid are extracted into the gas phase (condensing gas drive).

As used herein, minimum miscibility pressure (MMP) is defined as, at constant temperature and composition, the lowest pressure at which first- or multiple-contact miscibility (dynamic miscibility) can be achieved. At minimum miscibility pressure, the interfacial tension is zero and no interface exists between the fluids.

Also, as used herein, minimum miscibility concentration (MMC) (also termed "minimum miscibility enrichment" (MME)) is defined as, at constant temperature and pressure, the minimum quantity of additional components, such as intermediate-chain gases or CO2, that must be added to an injection gas to reach first-contact miscibility with a reservoir fluid at a given temperature and pressure. At minimum miscibility concentration conditions, the interfacial tension is zero and no interface exists between the fluids.

A variety of laboratory studies such as a multi-contact (MC) experiment (described below), slim tube test, rising bubble apparatus (RBA) and vanishing IFT test are employed to determine minimum miscibility pressure (MMP) or minimum miscibility enrichment (MME) of the injection gas and reservoir fluid. These experiments provide data that is used to develop fluid characterizations using equation-of-state (EOS) based thermodynamic simulation packages. Because these packages model equilibrium thermodynamic processes, dynamic data may require additional models or processing to be used for the fluid characterizations.

Slim tube displacement experiments are considered the industry standard technique to determine MMP and MME. The slim tube is a long metal tube (30-120 feet) with narrow internal diameter (¼ in), packed with sand or beads to create a well-characterized porous media. Initially, the tube is filled with oil and then the gas is injected at a specified pressure and temperature to displace the oil. During the displacement test, the mixing of the injection gas and the oil occurs dynamically in a dispersion zone wherein components from the oil are extracted into the gas and gas components dissolved in the oil. Therefore, condensing, vaporizing and vaporizing-condensing gas drive mechanisms are all possible in the test. The tests are performed at multiple pressures or enrichment levels. Oil recovery is measured as a function of injected gas volumes and the effluent is visually inspected to detect phase changes. The miscibility conditions, and sometimes the dominant mechanism (vaporizing gas drive or condensing gas drive), can be determined from this data. Although the slim tube test produces reliable results for miscibility studies, it requires extensive preparation and can require one to two weeks to produce data (See Elsharkawy, A. M., F. H. Poettmann, et al. (1992). Measuring Minimum Miscibility Pressure: Slim-Tube or Rising-Bubble Method? SPE/DOE Enhanced Oil Recovery Symposium. Tulsa, Okla., 1992 Copyright 1992, Society of Petroleum Engineers Inc. and Elsharkawy, A. M., F. H. Poettmann, et al. (1996). "Measuring CO2 minimum miscibility pressures: Slim-tube or rising-bubble method?" Energy & Fuels 10(2): 443-449). Also, asphaltene precipitation during the slim tube test can impact the interpretation of the test data due to partial or complete plugging of the packed bed. Further, because the process of developing miscibility in the slim tube test is dynamic, it cannot be used directly in equilibrium based PVT packages for model development.

A rising bubble apparatus (RBA) is a laboratory device used to indicate miscibility between reservoir oil and injection gas. A gas bubble is injected into an oil-filled visual cell at a given temperature and test pressure. The change in shape of the rising bubble indicates its miscibility with the oil at those conditions. Below the minimum miscibility pressure (MMP), the bubble holds its shape as it rises. Above the MMP, the bubble shape changes as it rises, e.g., the bubble may disintegrate, dissolve, or disappear into the oil. Testing at several pressures helps determine the MMP between the gas and oil. The rising-bubble test represents a forward-contacting miscibility process and therefore may not accurately estimate the MMP for a backward or combined contact mechanism. Backward contacts can be approximated by injecting several gas bubbles into the same column of oil. The shapes of the bubbles are analyzed by an experienced operator and the measured MMP is subjective (See Christiansen, R. L. and H. K. Haines (1987). "Rapid Measurement of Minimum Miscibility Pressure With The Rising-Bubble Apparatus." SPE Reservoir Engineering (Society of Petroleum Engineers) 2(4): 523-527). Hence, the RBA measurement is arguably less reliable and used for qualitative analysis only. In addition, there exists no standard design or operating procedure for these tests in the industry.

Another technique called "Vanishing Interface Technique" (VIT) measures the interfacial tension (IFT) of the oil and gas interface at varying pressures to determine the miscibility conditions (See Ahmadi, K. and R. T. Johns (2011). "Multiple-Mixing-Cell Method for MMP Calculations." SPE Journal 16(04): 733-742 and Ayirala, S. C. and D. N. Rao (2006). Comparative Evaluation of a New MMP Determination Technique. SPE/DOE Symposium on Improved Oil Recovery. Tulsa, Okla., USA, Society of Petroleum Engineers and Ayirala, S. C. and D. N. Rao (2011). "Comparative Evaluation of a New Gas/Oil Miscibility-Determination Technique." Journal of Canadian Petroleum Technology 50(9-10): 71-81). At minimum miscibility conditions, the interfacial tension is zero and no interface exists between the fluids. The MMP is determined by extrapolating the plot of IFT versus pressure to zero IFT. Although this technique is less time consuming than the slim tube test and provides equilibrium data, it will not follow a true multi-contact composition path. As a result, VIT is seldom used in practice.

A generalized MC experiment is described by Ahmadi that captures vaporizing, condensing and vaporizing-condensing drive mechanisms. See Ahmadi, K. and R. T. Johns (2011) "Multiple-Mixing-Cell Method for MMP Calculations." SPE Journal 16(04): 733-742. This type of study provides the flexibility to identify all mechanisms of the slim tube study and equilibrium data sets that can be used directly in equilibrium equation-of-state (EOS) packages. Unfortunately, the complexity of the experiment makes it impractical to execute in a laboratory using traditional methods.

Several microfluidics-based measurement techniques have been reported in literature related to solubility measurement (not miscibility) of gases in liquids at a specific mixing ratio. Rapid screening methods for $CO_2$ solubility in pure solvents and mixtures using segmented flow in a microchannel were reported by Lefortier, S. G. R., P. J. Hamersma, et al. (2012). "Rapid microfluidic screening of $CO_2$ solubility and diffusion in pure and mixed solvents." Lab on a Chip. A microfluidic method for measuring CO2-in-oil miscibility was reported by Nguyen, P., D. Mohaddes, et al. (2015). "Fast Fluorescence-Based Microfluidic Method for Measuring Minimum Miscibility Pressure of $CO_2$ in Crude Oils." Analytical Chemistry 87(6): 3160-3164. In this method, $CO_2$ bubbles were simultaneously injected into a microchannel with the oil while the microchannel was kept at reservoir temperature. When the pressure was below MMP, the $CO_2$ bubbles formed gas/liquid segmented flow. The miscibility condition was determined by increasing the pressure until the gas/liquid interface disappeared at the injection location in the channel. The mass transfer between the gas and oil in this technique emulates only the first contact miscibility condition. In this technique, it is not possible to simulate the multi-contact miscible displacement. Therefore, this test does not represent the same dynamic miscibility condition as in a slim tube.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Apparatuses and methods of simulating miscible displacement and rapid MMP and MME measurements in a microfluidic platform are described. In an embodiment, a new microfluidic technique for the determination of miscibility condition of a solvent in a sample reservoir fluid at reservoir conditions is described.

The microfluidic platform employs proposed microfluidic devices that emulate a generalized multi-contact miscible displacement experiment. The microfluidic devices include a specially designed microchannel that has cavities extending from a main channel. The flow condition in the channel mimics the multi-contact miscibility tests conducted in a conventional laboratory. This technique relies on the disappearance of the sample fluid (oil)-solvent interface at miscible condition to detect MMP (or MME) of a solvent flowing through a temperature-controlled microchannel. The concept was validated in a bench-top setup, using a synthetic oil (sample fluid) and $CO_2$ (solvent) system for which the MMP was known.

According to one aspect, a microfluidic device for determining miscibility of a solvent in a sample reservoir fluid under reservoir conditions (temperature and pressure) includes a substrate defining a microchannel having a length extending from an inlet to an outlet. The microchannel has an elongated main channel extending from the inlet to the outlet and has a plurality of cavities extending outward from the main channel along its length. The cavities are in fluid communication with the main elongated channel. The inlet may be couplable to a source of sample fluid and a source of solvent as well as an inlet pressure sensor to measure fluid pressure at the inlet. The outlet port may be couplable to an outlet pressure sensor to measure fluid pressure at the outlet and a valve configured to regulate the inlet pressure of fluid flowing through the microchannel.

In embodiments, the cavities extend at a non-zero angle relative to a central axis extending through the main channel. Also, in embodiments, the cavities are distributed along the main microchannel. In addition, in embodiments, the microchannel is generally linear along the length. Also, in embodiments, the microchannel is generally serpentine shaped along the length. Each cavity may have sides extending from the main channel and may have a tapered end. In embodiments, the cavities may or may not be symmetrically aligned across the main channel.

According to another aspect of the disclosure, a microfluidic system for determining miscibility of a solvent in a sample reservoir fluid (e.g., oil) under reservoir conditions (temperature and pressure) includes a microfluidic device, such as described above. Also, the system includes a supply of a quantity of sample reservoir fluid selectively fluidly coupled to the inlet of the microchannel, a first pump configured to introduce the sample reservoir fluid into the microchannel through the inlet, a supply of a quantity of solvent selectively fluidly coupled to the inlet of the microchannel, a second pump configured to introduce the solvent into the microchannel through the inlet after the sample fluid is introduced into the microchannel, and a pressure regulator or other pressure control device configured to control the inlet pressure of fluid flowing through the microchannel.

In embodiments, the system includes an inlet pressure sensor coupled to the microchannel and configured to measure fluid pressure in the microchannel at or near the inlet of the microchannel, and an outlet pressure sensor coupled to the microchannel and configured to measure fluid pressure in the microchannel at or near the outlet of the microchannel.

In embodiments, the system includes an image capture device configured to capture a series of images of at least a portion of the microchannel as a front of the solvent moves through the microchannel to the outlet of the microchannel.

The system may include an image processing device configured to process the series of images and determine whether a miscibility condition has been reached.

According to another aspect of the disclosure, further details of which are described below, a microfluidic method of determining a miscibility condition includes a) providing a microfluidic device that includes i) a substrate defining ii) a microchannel having an inlet and an outlet which define a length of the microchannel, where the microchannel has iii) an elongated main channel extending from the inlet to the outlet, and iv) a plurality of cavities extending outward from the main channel, with the cavities being in fluid communication with the main elongated channel, v) an inlet port fluidly coupled to the inlet of the microchannel, and vi) an outlet port fluidly coupled to the outlet of the microchannel; b) introducing a sample of reservoir fluid into the microchannel through the inlet port until the entire microchannel is filled with the reservoir fluid; c) after filling the entire microchannel with reservoir fluid, introducing a solvent of a certain composition into the microchannel through the inlet port at a controlled flow rate and inlet pressure, where the introduced solvent develops a front that moves along the main channel from the inlet to the outlet while displacing the reservoir fluid in the main channel; d) acquiring a series of images of at least a portion of the microchannel as the front moves from the inlet to the outlet, and e) determining, based on the acquired images, whether a miscibility condition has been reached by the time the front has reached the outlet.

The portion of the microchannel where the images are acquired may include at least one of: a region of the microchannel near the outlet; a region of the microchannel near the inlet; and a region of the microchannel between the inlet and the outlet. In embodiments, the determining of whether the miscibility condition is reached is based on determining whether an interface between the reservoir fluid and the solvent in one or more cavities is present. In embodiments, if the interface is present, then it is determined that the miscibility condition has not been reached, and if the interface is not present, then it is determined that the miscibility condition has been reached. In embodiments, if it is determined that the miscibility condition is reached, then a minimum miscibility pressure may be determined based on at least one of the inlet pressure and an outlet pressure. In embodiments, the minimum miscibility pressure is equal to the average of the inlet pressure and the outlet pressure.

The method may further include, if it is determined at e) that the miscibility condition has not been reached, iteratively repeating b) to e) until the miscibility condition is reached, but where the solvent introduced in c) in each iteration of b) to e) is introduced at an incremented inlet pressure.

Also, the method may further include, if it is determined at e) that the miscibility condition has not been reached, iteratively repeating b) to e) until the miscibility condition is reached, but where the composition of the solvent introduced in c) in each iteration of b) to e) is changed to so that the composition has incrementally heavier gas components.

Other aspects and advantages of the invention will be apparent from the following description and the appended claims.

BRIEF DESCRIPTION OF THE DRAWINGS

Certain embodiments of the disclosure will hereafter be described with reference to the accompanying drawings, where like reference numerals denote like elements. It should be understood, however, that the accompanying figures illustrate the various implementations described herein and are not meant to limit the scope of various technologies described herein.

FIG. 3C depicts solvent/sample fluid flow in the microchannel of the chip of FIG. 3A under miscible conditions;

DETAILED DESCRIPTION

Figure 1:
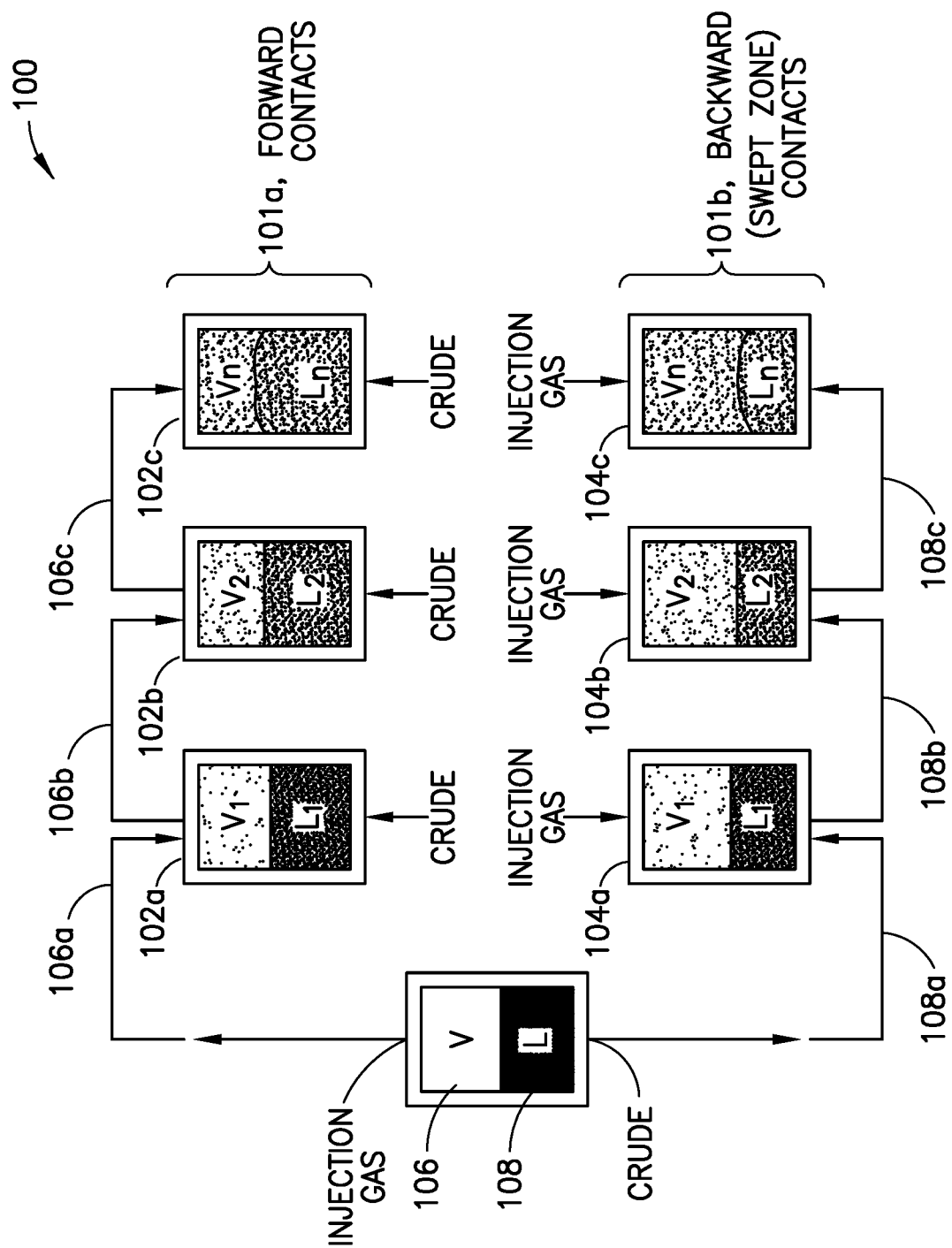
FIG. 1 depicts a schematic of a multi-contact miscibility measurement apparatus and method in a static cell.

Illustrative embodiments of the present disclosure are described below. In the interest of clarity, not all features of an actual implementation are described in this specification. The particulars shown herein are by way of example and for purposes of illustrative discussion of the examples of the subject disclosure only and are presented in the cause of providing what is believed to be the most useful and readily understood description of the principles and conceptual aspects of the subject disclosure. It will be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure. In this regard, no attempt is made to show structural details in more detail than is necessary, the description taken with the drawings making apparent to those skilled in the art how the several forms of the subject disclosure may be embodied in practice. Further, like reference numbers and designations in the various drawings indicated like elements.

For the purposes of this disclosure, the term "reservoir fluid" means a fluid stored in or transmitted from a subsurface body of permeable rock. Thus, "reservoir fluid" may include, without limitation, hydrocarbon fluids, saline fluids such as saline water, as well as other formation water, and other fluids such as carbon dioxide in a supercritical phase.

Moreover, for the purposes of this disclosure, the term "microfluidic device" means a device having a fluid-carrying channel exhibiting a width within a range of tens to hundreds of micrometers but exhibiting a length that is many times longer than the width of the channel. Similarly, the term "microchannel" means a fluid-carrying channel exhibiting a width within a range of tens to hundreds of micrometers. Although many of the microchannels described herein are of rectangular cross section due to the practicalities of fabrication techniques, the cross section of a microchannel can be of any shape, including round, oval, ellipsoid, square, etc.

A microfluidic device employs one or more microchannels (capillaries) where the surface area in contact with fluid flowing in the microchannel is relatively large compared to the volume of the fluid flowing through the microchannel. As a result, the heat transfer between the sample and its surroundings is rapid and the temperature of the fluid in the microchannel can be changed rapidly. Also, due to the small dimensions of microchannel, the sample volume required in the microfluidic device amounts to a few micro-liters of liquid. For example, the size of a microchannel's cross-section is on the order of the length scale of reservoir pores (10 to 100 microns).

Therefore, the testing methods and systems described herein utilize a microfluidic device for rapid and accurate detection of miscibility between a solvent flowing through the microfluidic device, which is loaded with a quantity of a sample reservoir fluid. The temperature of the microfluidic device can be precisely controlled and maintained, along with the flow rate and pressure of the solvent. The pressure-driven flow of the solvent in the microfluidic device is monitored using pressure sensors while the microfluidic device is visually observed to identify a miscibility condition between the solvent and the sample reservoir fluid.

FIG. 1 is a schematic illustration of a multi-contact (MC) experimental apparatus 100. The apparatus 100 includes a plurality of containers or reservoirs 102a, 102b, 102c that contain amounts of sample fluid (e.g., reservoir fluid such as oil) and a plurality of containers or reservoirs 104a, 104b, 104c that contain amounts of solvent (e.g., a gas, such as carbon dioxide). The containers 102a, 102b, and 102c are fluidly coupled to each other in series, and the containers 104a, 104b, and 104c are fluidly coupled to each other in series.

A container 106 holding a quantity of solvent is fluidly coupled to container 102a by fluid line 106a. Container 102a is fluidly coupled to container 102b by fluid line 106b, and container 102b is fluidly coupled to container 102c by fluid line 106c. Solvent in container 106 can be driven by pressure from the container 106 through line 106a and introduced first into the container 102a, then through line 106b into container 102b, and then through line 106c into container 102c. The pathway from container 106 to container 102c is termed a "forward contact portion" 101a of the system 100. As a leading front of the solvent flows respectively into each container 102a, 102b, and 102c, the solvent front successively contacts the sample fluid in each container. Upon each contact with fresh sample fluid, the solvent can become enriched in components extracted from the sample fluid. The pressure-driven flow of the solvent in the containers 102a, 102b, and 102c may be monitored using pressure sensors, such as at the inlet of container 102a and at the outlet of container 102c, while the containers 102a, 102b, and 102c are visually inspected to identify a miscibility condition between the solvent and the sample fluids in the containers. A miscibility condition will be reached when an interface between the solvent and the sample fluid disappears.

Similarly, a container 108 holding a quantity of the sample fluid is fluidly coupled to container 104a by a fluid line 108a. Container 104a is fluidly coupled to container 104b by fluid line 108b, and container 104b is fluidly coupled to container 104c by fluid line 108c.

Sample fluid in container 108 can be driven by pressure from the container 108 through line 108a and introduced first into the container 104a, then through line 108b into container 104b, and then through line 108c into container 104c. The pathway from container 108 to container 104c is termed a "backward contact portion" 101b of the system 100. As a leading front of the sample fluid flows respectively into each container 104a, 104b, and 104c, the sample fluid front successively contacts the solvent fluid in each container. Upon each contact with fresh solvent, the sample fluid can become enriched in components extracted from the solvent. The pressure-driven flow of the sample fluid in the containers 104a, 104b, and 104c may be monitored using pressure sensors, such as at the inlet of container 104a and at the outlet of container 104c, while the containers 104a, 104b, and 104c are visually inspected to identify a miscibility condition between the sample fluid and the solvent in the containers. A miscibility condition will be reached when an interface between the solvent and the sample fluid disappears.

In one example where the sample fluid is oil and the solvent is gas, if the primary or dominant mechanism for developing miscibility is extraction of components of the oil into the gas, the process is called a vaporizing gas drive, in which case miscibility will be observed in the forward contact portion 101a of the apparatus 100. Alternatively, if the primary or dominant mechanism for developing miscibility is the dissolution of components of the gas into the oil, the process is called a condensing gas drive, in which case miscibility will be observed in the backward contact portion 101b of the apparatus 100. In what are termed "vaporizing-condensing drives" both vaporizing gas drive and condensing gas drive mechanisms are important, which may not be observable in the aforementioned prior art multi-contact miscibility experiments.

$CO_2$, $N_2$, and lean hydrocarbon (HC) gases, when used as solvents in oil, are dominantly vaporizing gas drives. Rich HC gases can have significant condensing character. Developed miscibility generally occurs at lower pressures for a given gas composition and, in the case of HC gases, for leaner HC gases at a given pressure. Therefore, the conditions at which developed miscibility occur often represent optimal economic operating conditions for gas injection EOR processes, since the cost of operating compressing equipment for injecting compressed solvent gases into formations generally increases with increasing pressure. Thus, operating such compressing equipment at lower injection pressures is generally preferred.

Developed miscibility conditions can be determined under laboratory conditions using the apparatus 100. Two different types of experimental studies may be performed using the experimental apparatus 100. The dominant mechanism for obtaining miscibility (e.g., vaporizing gas drive or condensing gas drive) may determine which of the two types of studies is suitable as well as the appropriate experimental methods.

In a first type of experimental study, the apparatus 100 can be used to measure the minimum miscibility pressure (MMP). A solvent of fixed composition in container 106 can be pressurized to a certain pressure to flow through line 106a and between the containers 102a, 102b, and 102c. The interfaces between the solvent and the sample fluid in the containers 102a, 102b, and 102c can be observed to determine whether any of the interfaces have vanished by the time the solvent front has exited the container 102c. If the interfaces have not disappeared, it is determined that the miscibility condition has not been reached, and the process of introducing the solvent and observing the interfaces is repeated iteratively, except that the pressure of the introduced solvent is incremented in each iteration until an interface in one or more of the containers 102a, 102b, and 102c vanish. The average pressure across the containers 102a, 102b, and 102c when the miscibility condition is reached can be equated to the minimum miscibility pressure (MMP).

In a second type of experimental study, the apparatus 100 can be used to measure minimum miscibility enrichment (MME), which is alternatively termed minimum miscibility concentration (MMC). The MME or MMC is defined as the mole fraction of the solvent (such as butane, hydrogen sulfide, or others) required to reach miscibility at a given pressure and temperature. At MMC or MME conditions, the interfacial tension is zero and no interface exists between the fluids. Often solvents are mixtures of hydrocarbon (HC) gases. Injected HC gas typically contain methane (C1), ethane (C2), propane (C3) and butane (C4). In the second study, a HC gas solvent of a certain composition flows across and between containers 102a, 102b, and 102c, while the average pressure across the containers 102a, 102b, and 102c, is controlled to be constant. Then, after the solvent flows across all of the containers, the containers 102a, 102b, and 102c are observed to determine if an interface between the solvent and the fluids in the containers 102a, 102b, and 102c have vanished. If no interfaces vanished, miscibility has not been reached and the process of introducing solvent is repeated at the same pressure, but the composition of the HC solvent is changed. Specifically, in each subsequent iteration, a ratio of the quantity of C1 to the quantity of heavier gas components C2-C4 may be adjusted until developed miscibility is observed, which ratio is called the minimum miscibility enrichment (MME) or minimum miscibility concentration (MMC).

Figure 2:
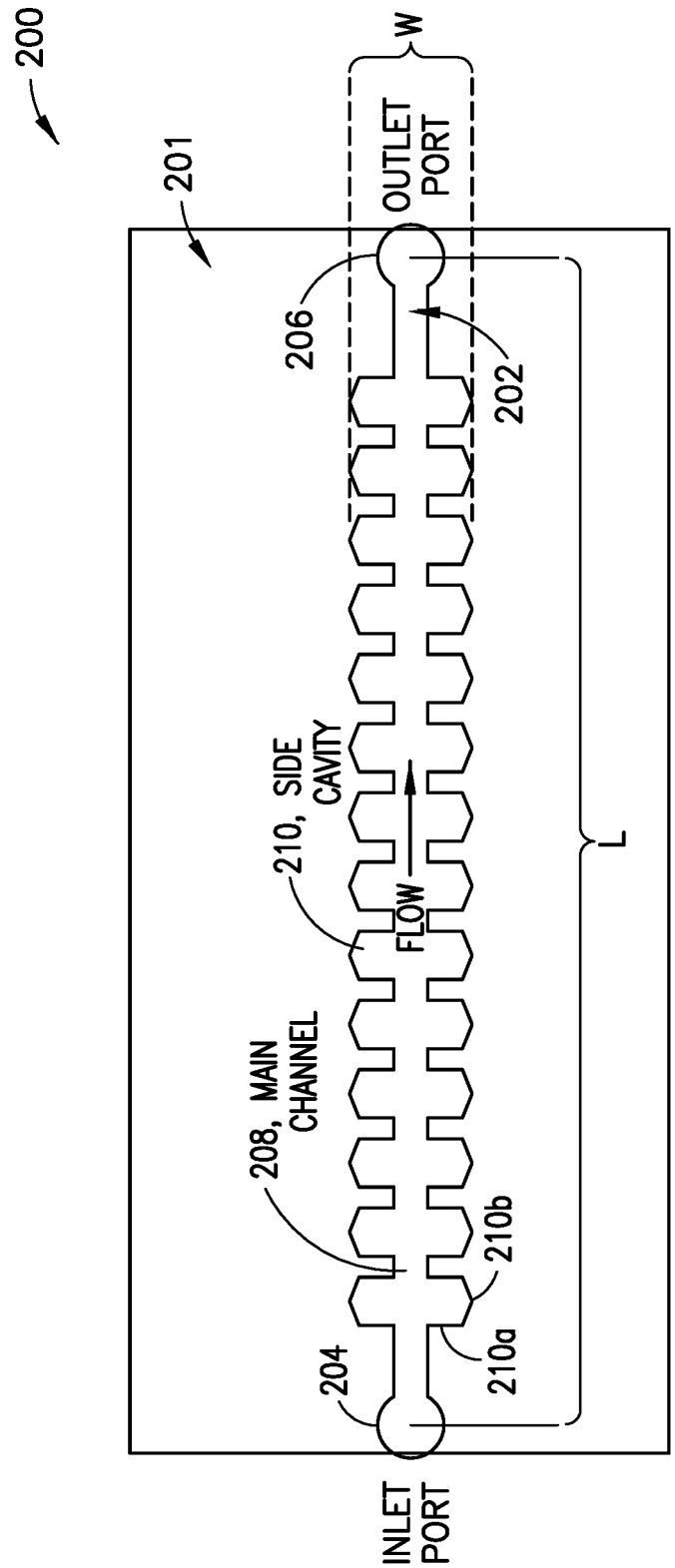
FIG. 2 depicts an embodiment of a microfluidic chip having a microchannel in accordance with an aspect of the disclosure.
Figure 6:
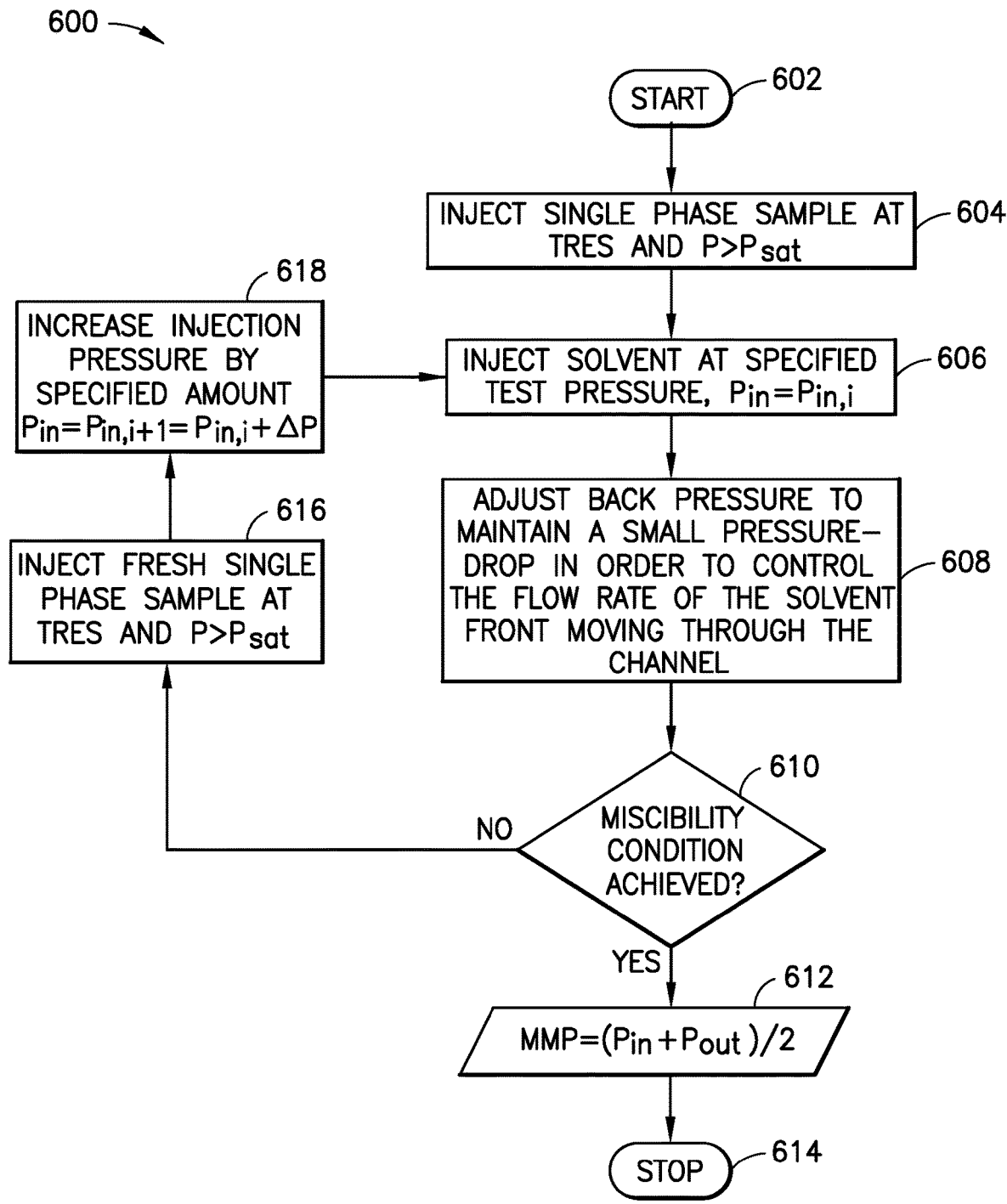
FIG. 6 depicts a workflow for measuring the minimum miscibility pressure (MMP)

The apparatus 100 may be embodied as a microfluidic device, such as a microfluidic chip 200 shown in FIG. 2. A workflow using the microfluidic chip 200 is shown in FIG. 6 for measuring MMP, but which can be modified for measuring MME, as described in further detail below.

In a non-limiting example, the microfluidic chip 200 includes a substrate 201 in which a microchannel 202 is formed, such as by a microfabrication process. The chip 200 may be made from Borofloat™ glass and silicon using standard microfabrication processes. The microchannel 202 has a length "L" that extends from an inlet 204 to an outlet 206. The microchannel 202 provides fluidic passage of sample fluids (e.g., oils) and solvents (gas or liquid) between the inlet 204 and outlet 206. The channel 202 is shown having a generally straight line form along the length L between the inlet 204 and outlet 206.

The microchannel 202 includes a central main channel 208, which is shown extending along a centerline A-A of microchannel 202, and a plurality of side cavities 210 extending outward (with respect to the centerline A-A) from the main channel 208. The cavities 210 extend at non-zero angles with respect to the central axis A-A. In the example shown in FIG. 2, the non-zero angle is ninety degrees. The cavities 210 are in fluid communication with the main channel 208. The cavities 210 are distributed along the length L of the main channel 208. In the example shown in FIG. 2, the cavities are equally spaced from one another along the length "L" of the main channel 208, although this is not a requirement. The configuration of the cavities 210 and the main channel 208 mimics the containers 102a-102c and 104a-104c and the fluid connections therebetween of the multi-contact test apparatus 100 described above. Indeed, the microchannel 202 facilitates mass transfer between a sample fluid in the cavities 210 and a solvent flowing in the main channel 208 past those cavities 210 in the same manner as solvent flowing across containers 102a-102c in the test apparatus 100 described above.

In the embodiment shown in FIG. 2, each cavity 210 is shown having straight sides 210a and a tapered end 210b. In other embodiments, the cavities 210 may have a curved end and/or sides or may have other shapes that combine straight and curved segments. Also, in FIG. 2, the cavities 210 are directly aligned with each other across the centerline A-A. However, while this configuration of the cavities 210 is shown, the cavities 210 may have other distribution patterns than what is shown in FIG. 2. Indeed, in other embodiments, the cavities 210 may be offset from one another across the centerline A-A, as shown in FIG. 3a.

Figure 3A:
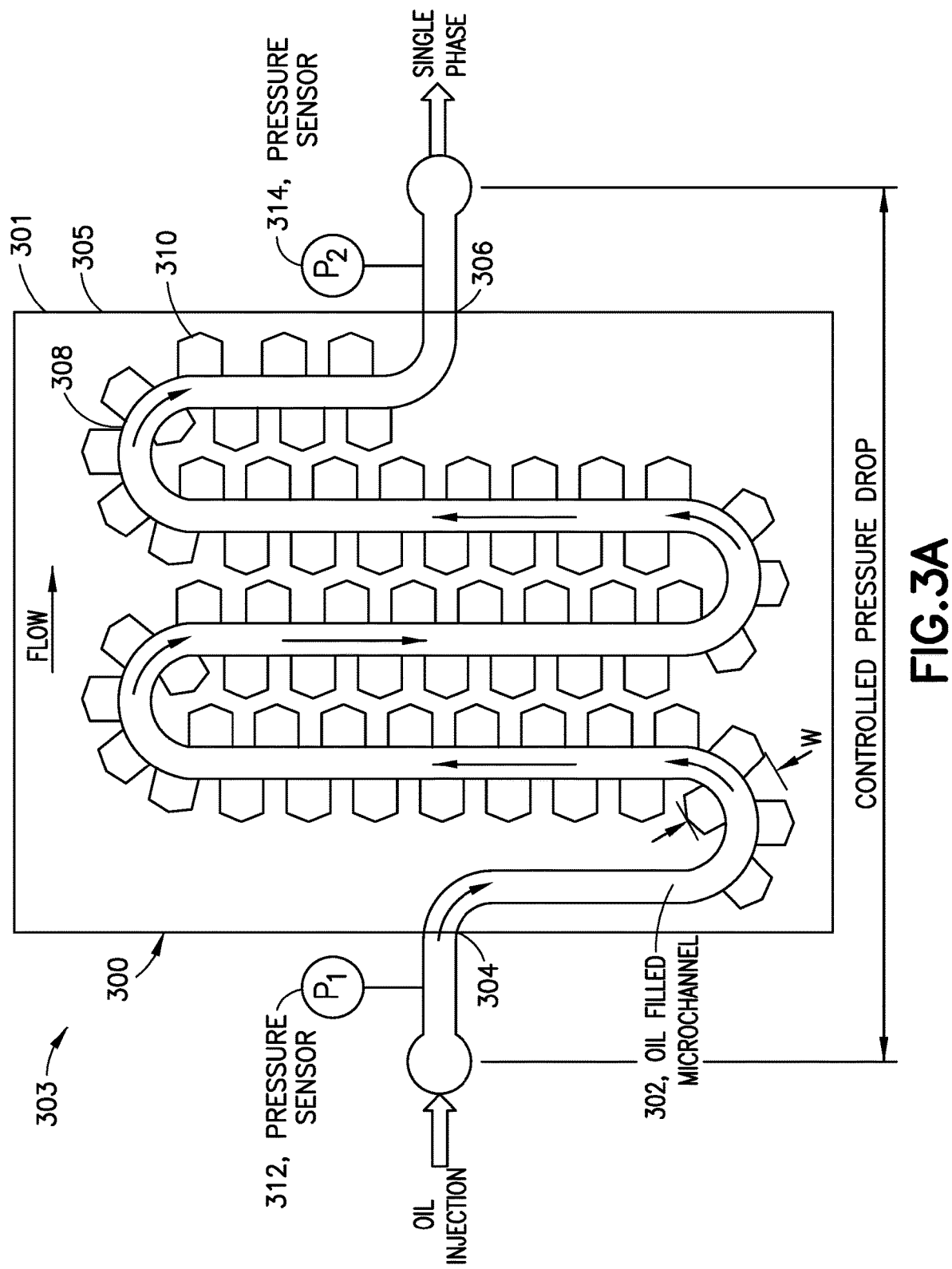
FIG. 3A depicts another embodiment of a microfluidic chip used in a system in accordance with an aspect of the disclosure.

FIG. 3A illustrates an embodiment of a microfluidic system 303 that includes a microfluidic chip 300. The chip 300 includes a substrate 301 that defines a microchannel 302 having a length "L" that extends in a serpentine manner from an inlet 304 to an outlet 306. The microchannel 302 has a main channel 308 and a plurality of cavities 310 extending outwardly from the main channel 308. One notable difference between microchannel 302 and the microchannel 202 in FIG. 2 is that the microchannel 302 has a serpentine shape, whereas microchannel 202 is straight. Also, the length of microchannel 302 is longer than the length of microchannel 202. Also, as noted above, another difference between the channel 302 and channel 202 is that the cavities 310 shown in FIG. 3a are staggered from each other across the main channel 308 rather than aligned as are the cavities 210 in channel 202, which can increase the number of cavities per unit length of the main channel.

The system 303 also includes a pressure sensor 312 fluidly coupled to the channel 302 at or near the inlet 304 to monitor the pressure in the microchannel 302 at that location, and a pressure sensor 314 fluidly coupled to the channel 302 at or near the outlet 306 to monitor the pressure in the microchannel at that location. The microfluidic chip 300 can be supported by (or otherwise thermally coupled to) a temperature-controlled cooling/heating surface 305 that provides for temperature control of the microfluidic chip 300 (including the microchannel 302 therein). The temperature may be controlled so that the microchannel is maintained at or near a reservoir temperature ($T_{res}$) at which a sample reservoir fluid exists at the time of its extraction from the reservoir.

Figure 5:
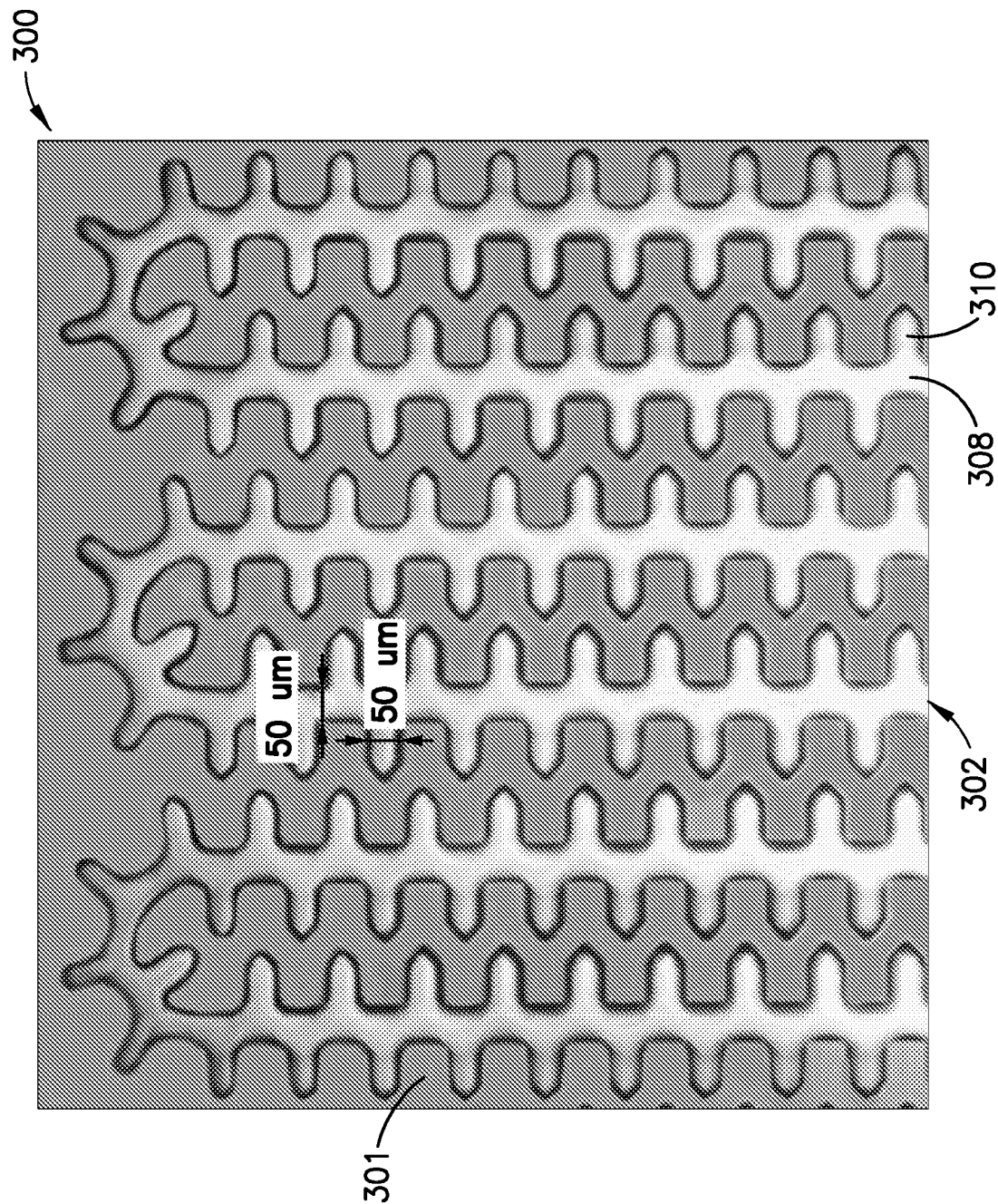
FIG. 5 depicts a microscopic image of a microchannel of a chip of the system of FIG. 4 when the microchannel is empty.

In one example embodiment, the microchannel 302 may have a length of about 3 meters. The microchannel 302 may have a depth of about 100 µm in the main channel 308 as well as in the cavities 310. The widths of the main channel 308 and the cavities 310 may be 50 µm, such that the total width "w" of the channel 302 may be 150 µm. A photograph of a section of the microchannel 302 captured though an image capture device (e.g., microscope) is shown in FIG. 5. The channel 302 may have many other cross-sectional dimensions and/or geometrical shapes. The microfluidic chips and system described herein are designed to withstand high pressure and temperature conditions such as those approximating the in-situ conditions in the reservoir from which the sample fluid has been extracted.

The system 303 may be used to determine MMP in accordance with the workflow 600 shown in FIG. 6. At 602 the chip 300 is provided with the microchannel 302 empty and cleaned of all contaminants. Also, at 602 the temperature of the chip 300 is adjusted to a predetermined temperature, such as a temperature approximating reservoir conditions, $T_{res}$. At 604 a single-phase sample reservoir fluid (e.g., oil from the reservoir) is introduced through the inlet 304 into the channel 302 at $T_{res}$ and a pressure that is greater than the saturation pressure of the sample reservoir fluid. The single-phase sample reservoir fluid is introduced until it fills the entire microchannel 302, including the main channel 308 and all of the cavities 310.

Figure 3B:
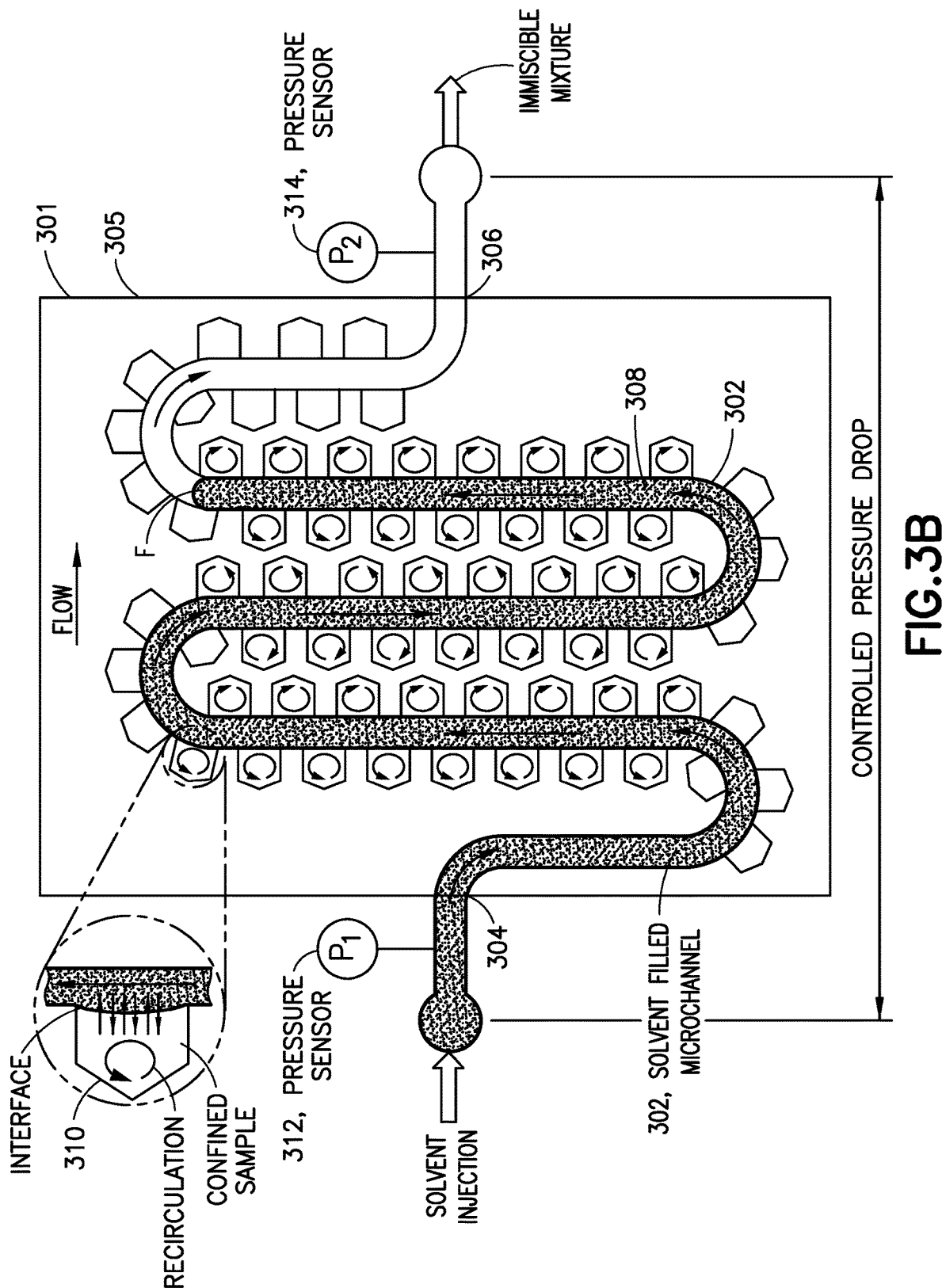
FIG. 3B depicts a solvent flowing through a microchannel of the microfluidic chip of FIG. 3A. Flow direction is shown by the arrows in a main, central channel. The exploded portion of FIG. 3B (inset) shows details of a solvent/sample fluid interface in cavities, which extend from the main channel, when the fluids are immiscible.

Once the main channel 308 and the adjoining cavities 310 are completely filled with the sample fluid, the flow of the sample fluid into the channel 302 stops. Then, at 606 solvent is injected through the inlet 304 into the microchannel 302 at a certain inlet pressure, P1. At 608 the flow rate of the solvent is regulated to regulate the pressure difference between the inlet and the outlet pressures (P1-P2), which is preferably maintained constant as the solvent flows. As the solvent flows through the channel 302, it displaces the sample fluid from the main channel 308, as shown in FIG. 3B. In FIG. 3B, a defined front "F" is shown, which moves through the main channel 308 as the solvent is introduced into the channel 302. However, the cavities 310 are designed such that the sample fluid remains confined in the cavities 310 while the solvent flows across the cavities along the main channel 308. Thus, as the front of the solvent stream progresses through the main channel 308, and passes the cavities 310, the solvent successively contacts fresh sample fluid in the cavities 310, which is analogous to the solvent in container 106 successively contacting sample fluid in containers 102a, 102b, and 102c, described above.

Once the front "F" has reached the outlet 306, it is determined at 610 whether or not the miscibility condition has been reached. The determination in 610 is based on a visual observation of a part or whole of the microchannel 302, such as some of the cavities 310. Such visual observation may be performed using automated means, such as with an image acquisition device (e.g., a digital camera) and an image processing apparatus, described in greater detail below. If the sample fluid and the solvent are not miscible at the certain inlet pressure P1, a distinct sample fluid/solvent interface is established and is visible in each cavity 310, as shown in the exploded inset portion of FIG. 3B.

The sample fluid/solvent interface allows efficient mass transfer between the small volume of sample fluid in the cavity 310 and the solvent stream in the main channel 308. The solvent flow in the main channel 308 across the cavity 310 interface generates recirculation inside the cavities 310 (as represented by curved arrows inside the cavities shown in FIG. 3B), which promotes mixing action between the solvent and the sample fluid. This mixing action helps in homogenizing the sample fluid phase in each cavity 310. The mass transfer between the solvent and the sample fluid in the cavities 310 distributed along the main channel 308 emulates the multi-contact miscible displacement described above with respect to the test apparatus 100 of FIG. 1. The interfacial mass transfer (otherwise termed recirculation efficiency) can be optimized by controlling the width, depth, and shape of the cavities 310 and the inter-cavity spacing.

The contact between the two phases can also be increased by increasing the length L of the microchannel 302 (i.e., allowing for more cavities 310). When the sample fluid and the solvent become miscible, the interface between the two phases ceases to exist, as shown in FIG. 3C (see also the exploded inset in FIG. 3C). The interfacial mass transfer can also be influenced by the flow rate of the solvent moving in the main channel 308 across the entrance of the cavities 310, the composition of the solvent, the composition of the sample fluid, and the temperature at which the interface exists.

By systematically controlling the test conditions, such as solvent inlet pressure and sample fluid temperature, and the solvent composition (e.g., by increasing the carbon concentration in a HC solvent), the condition at which the sample fluid-solvent interface disappears can be visually observed. For vaporizing gas drives, the interface will vanish near the front "F" of the solvent flow. For condensing drives, the interface will vanish close to the inlet 304. Mixed mechanism drives will develop miscibility at an intermediate location between the inlet 304 and front "F" of the solvent flow.

Thus, if it is determined at 610 by visual observation that the miscibility condition has been achieved at the inlet pressure P1 (YES at 610), then the workflow continues to 612 where MMP is calculated as the average pressure ((P1+P2)/2) in the channel 302, and the workflow ends at 614.

However, if it is determined at 610 that miscibility has not been achieved at the tested inlet pressure P1 (NO at 610), then the workflow continues to 616. At 616 fresh sample reservoir fluid is introduced to the channel 302 through the inlet 304 in the same manner as in 606. Once the main channel 308 and the adjoining cavities 310 are re-filled completely with the sample reservoir fluid, the flow of the sample reservoir fluid into the channel 302 stops. Then, at 618 the solvent is reintroduced into the microchannel 302 while the inlet pressure P1 for the injection of the solvent is incremented by a certain incremental pressure ($\Delta P$). The workflow then repeats steps 606 to 610, but at the higher incremented inlet pressure. The temperature of the microchannel 302 is again maintained at $T_{res}$.

If miscibility still has not been achieved at 610 at the higher inlet pressure P1, then steps 616, 618, 606, 608, and 610 are repeated until miscibility has been achieved, in which case the MMP will be calculated based on the average pressure ((P1+P2)/2) at which MMP is reached as in 612, and the workflow then ends at 614.

It will be appreciated that instead of incrementing the inlet pressure of the solvent to determine MMP, the system 303 can be used with a modified workflow to workflow 600 to determine the MME. This can be done by modifying step 618 to stepwise vary the concentration of the intermediate-chain gases or $CO_2$ in the solvent, while maintaining a constant inlet pressure and temperature and modifying step 612 to determine minimum miscible concentration as the concentration of the intermediate-chain gases at which miscibility is achieved.

Figure 4:
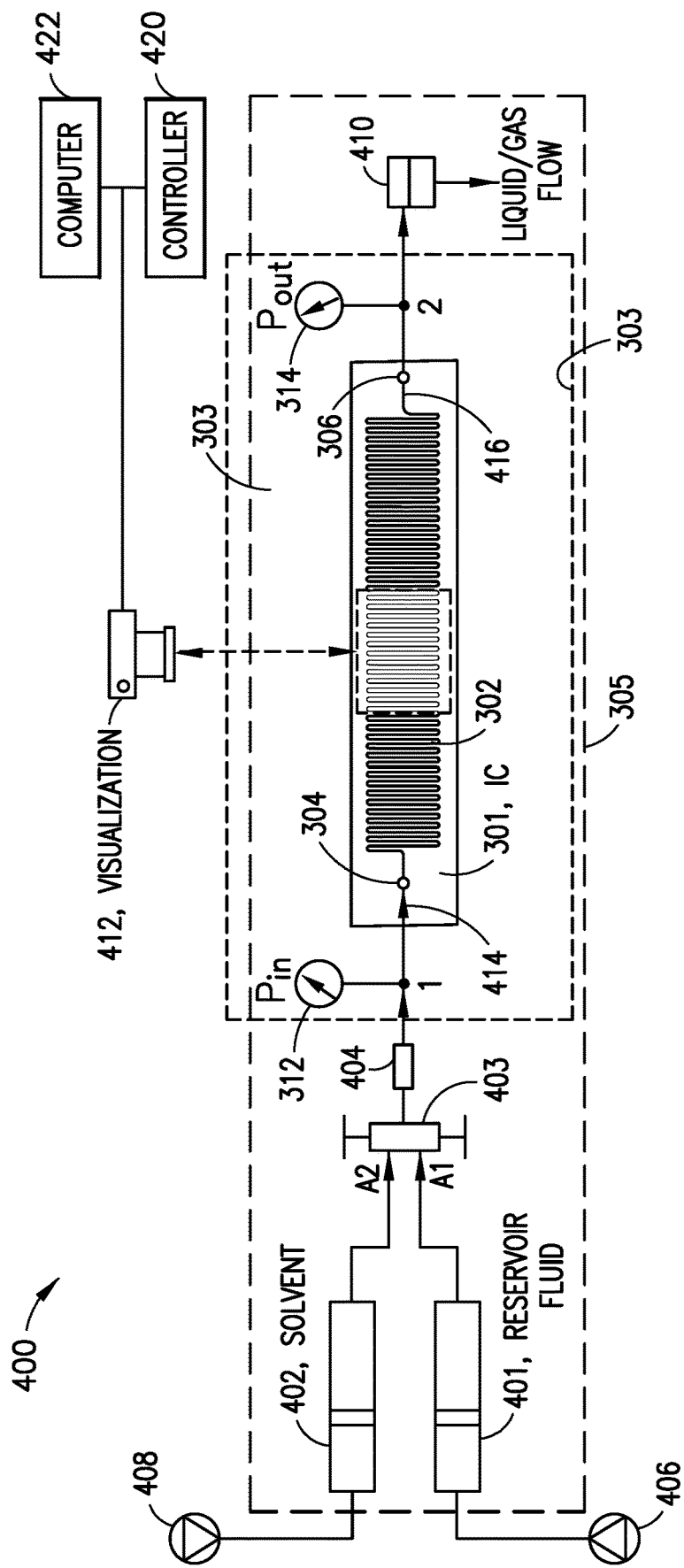
FIG. 4 depicts a schematic of another embodiment of an experimental system in accordance with this disclosure.

The system 303 of FIG. 3A may be incorporated as a sub-system into a larger experimental system 400 shown in FIG. 4 or may be used as a standalone system as described above. The temperature-controlled cooling/heating surface 305 is configured to provide for temperature control of the microfluidic chip 300 (including the microchannel 302 therein) independent of the temperature of the rest of the system 400. Temperature sensors 414 and 416 are connected to microchannel 302. Sensor 414 is connected upstream of sensor 416. The temperature sensors 414 and 416 can be used to monitor the temperature of the microchannel 302. The temperature sensors 414 and 416 can be thermocouples, such as the Omega 5TC-TT-K 40-36 available from Omega Engineering Inc. of Laval, Quebec, Canada. The temperature-controlled cooling/heating surface 305 can be used to control the temperature of specific sections of the microchannel 302 instead of the entire channel 302. In this case, the temperature sensors 414 and 416 can be used to measure the temperature gradient along the sections of the microchannel 302 for control of the temperature gradient by cooling/heating surface 305. The temperature-controlled cooling/heating surface 305 can be a thermo-electric plate, such as a TEC model TC-36-25 RS485, available from TE Technology, Inc. of Traverse City, Mich., USA.

In system 400 the sub-system 303 is fluidly coupled to a first cylinder or reservoir 401 that is loaded with a quantity of a sample reservoir fluid (e.g., oil). The first cylinder 401 may be a hydraulic cylinder equipped with a floating sealed-piston to isolate the sample fluid from a hydraulic fluid in the first cylinder 401. A first pump 406 (e.g., a precision electric pump) is fluidly coupled to the first cylinder 401, which may pump the hydraulic fluid to move the floating sealed-piston to pressurize the sample fluid. In one embodiment, the cylinder 401 and pump 406 can be an electrically-controlled syringe pump, such as the ISCO 65D available from Teledyne Technologies Inc. of Lincoln, Nebr., USA.

Also, the sub-system 303 is fluidly coupled to a second cylinder 402 that is loaded with a quantity of a solvent. The second cylinder 402 may be a hydraulic cylinder equipped with a floating sealed-piston to isolate the solvent from a hydraulic fluid in the second cylinder 402. A second pump 408 (e.g., a precision electric pump) is fluidly coupled to the second cylinder 402, which may pump the hydraulic fluid to move the floating sealed-piston to pressurize the solvent. In one embodiment, the cylinder 402 and pump 408 can be an electrically-controlled syringe pump, such as the ISCO 65D available from Teledyne Technologies Inc. of Lincoln, Nebr., USA.

The first and second cylinders 401 and 402 have outlets that are fluidly coupled to a three-way valve 403, which may be a manually or remotely actuated valve (e.g., electrically or pneumatically actuated). The valve 403 is configured to selectively control the flow of solvent and sample into the sub-system 303. In a first configuration, the valve 403 is open and fluidly connects only the first cylinder 401 to the inlet 304 of the microchannel 302. In a second configuration, the valve 403 is open and fluidly connects only the second cylinder 402 to the inlet 304 of the microchannel 302. In a third configuration, the valve 403 is closed so that neither cylinder 401, nor cylinder 402 is fluidly connected to the inlet 304 of the microchannel 302. The valve 403 may be manually or remotely actuated to selectively configure the valve between the first, second, and third configurations.

The first cylinder 401 and pump 406 and the valve 403 may be operated to introduce the sample fluid (preferably at or near a constant flow rate) into the inlet port 304 of the chip 300, and while the temperature of the channel 302 is maintained at or near the reservoir temperature $T_{res}$. A pressure sensor 312 (such as the Sensotreme sensor available from Sensotreme GmbH of Ramsen, Switzerland) monitors the inlet pressure (P1) of the sample reservoir fluid at or near the inlet 304 of the microchannel 302. The second cylinder 402 and pump 408 and the valve 403 may be actuated to introduce the solvent (preferably at or near a constant flow rate) into the inlet port 304 of the chip 300. An in-line filter 404 (approximately 20 μm) may be fluidly coupled between the valve 403 and the inlet port 304 to remove particulate matter that could potentially clog the microchannel 302 of the microfluidic chip 300.

The outlet 306 of the microchannel 302 is fluidly coupled to a pressure sensor 314 and a backpressure controller 410 (e.g., a pressure regulator or a pump). The backpressure controller 410 is configured to apply a back-pressure to the microchannel 302 to maintain a constant pressure drop across the microchannel 302 (e.g., of about 50 psi). A pressure sensor 314 (such as the Sensotreme sensor available from Sensotreme GmbH of Ramsen, Switzerland) monitors an outlet pressure (P2) in the channel 302 at or near the outlet 306 of the microchannel.

An image capture device 412, which may include a light source and a camera, is configured to capture high-resolution images of the microchannel 302. Such images can be used to detect the presence (or absence) of an interface between a solvent and a sample reservoir fluid in the microchannel 302, which is useful in determining whether the miscibility condition has been reached. In one embodiment, the image capture device includes a CCD camera with 20× magnification lens and a light source to visualize the microchannel 302.

The system 400 may also include a controller 420 and/or computer processing system 422 that includes control logic that interfaces to one or more of: the electrically-controlled cylinders 401 and 402 and pumps 406 and 408 via wired or wireless signal paths therebetween for control of the operation of the pumps 406 and 408; the electrically-controlled valve 403 via wired or wireless signal paths therebetween for control of the operation of the valve 403 to the temperature-controlled cooling/heating surface 305 via wired or wireless signal paths therebetween in order to provide for temperature control of the temperature controlled cooling/heating surface; the pressure sensors 312 and 314 via wired or wireless signal paths therebetween (not shown) for pressure measurements and recordation of such pressure measurements during operation of the test system 400; and the temperature sensors 414 and 416 via wired or wireless signal paths therebetween (not shown) for temperature measurements and recordation of such temperature measurements during operation of the test system 400. The controller 420 and/or computer processing system 422 can also interface to the image capture device 412 via wired or wireless signal paths therebetween (not shown) in order to capture high resolution images of the microchannel 302 and recordation of such high-resolution images and possibly display of such high-resolution images during operation of the test system 400.

The control logic of the controller 420 and/or computer processing system 422 (which can be embodied in software that is loaded from persistent memory and executed in the computing platform of the computer processing system 422) is configured to control the different parts of the test system 400 to carry out a sequence of operations (workflow) that characterizes properties related to the miscibility condition (such as MMP and MME) of the sample fluid that is introduced into the microchannel 302 of the microfluidic chip 300 as described herein. The control logic can be configured by user input or a testing script or other suitable data structure, which is used to configure the controller 420 or the computer processing system 422 in order to carry out control operations that are part of the workflow as described herein. For example, the user input or the testing script or other suitable data structure can specify parameters (such as pressures, flow rates, temperatures, etc.) for such control operations of the workflow.

The workflow 600 of FIG. 6 may be performed using the system 400 as follows. At 602 the workflow begins and it is assumed that the reservoir or cylinder 401 is filled with a sufficient quantity of the reservoir sample fluid and the reservoir or cylinder 402 is filled with a sufficient quantity of solvent. Also at 604 the microchannel 302 is completely empty and clean. The temperature of the chip 300 is also set to be about $T_{res}$(+/−0.5 degrees C.). At 604 the system 400 is initialized so that cylinder 401 and pump 406 and valve 403 are controlled to introduce the sample fluid from the cylinder 401 into the inlet 304 of the microfluidic chip 300, while the cylinder 402 and pump 408 and the valve 403 are controlled to not introduce the solvent into the inlet port 304. The sample fluid is introduced until the entire microchannel 302 is filled with the sample fluid.

At 606 the system 400 is reconfigured so that cylinder 402 and pump 408 and valve 403 are controlled to introduce the solvent from the cylinder 402 into the inlet 304 of the microchannel 302, while the cylinder 401, pump 406, and the valve 403 are configured to not introduce the solvent into the inlet 304. The solvent is introduced at a first inlet pressure (P1), which can be maintained by the backpressure controller 410. At 608 the backpressure controller 410 controls the backpressure to maintain a small pressure drop across the microchannel 302 in order to control the flow rate of the solvent front moving through the main channel 308. As the solvent is moving in the microchannel 302, the image capture device 412 acquires images of one or more portions of the microchannel 302 and the controller 420 and/or the computer processing system 422 can use the acquired images to automatically determine whether a miscibility condition has been achieved at 610 by the time that the solvent front has reached the outlet port 306. The image capture processing may use real-time image analysis.

If miscibility has been achieved, the MMP is calculated at 612 by the computing processing system 422 from the inlet pressure (P1) measured by the pressure senor 312 and the outlet pressure (P2) measured by the pressure sensor 314. Specifically, the MMP is equated to the average of the inlet and outlet pressures, ((P1+P2)/2). Once the MMP is calculated, the workflow ends at 616. Otherwise, if the miscibility condition is not observed by the time the solvent front reaches the outlet port 306, then the solvent inlet pressure (P1) is increased at 614 by adjusting the backpressure regulator 410 and the steps 606, 608, and 610 are repeated. The increase in the inlet pressure P1 may be a predetermined step increase. The steps 606, 608, 610, 616, and 618 are repeated with incrementally higher inlet pressure (P1) until the miscibility condition is observed, at which point the MMP is calculated at 612 based on the higher inlet pressure P1 and the corresponding outlet pressure (P2) observed when the miscibility condition is observed. Then, after calculating the MMP, the workflow ends at 614, as described above.

Thus, the workflow carries out a sequence of operations in steps 606, 608, 610, 616, and 618 that vary the pressure of the solvent in the microchannel 302 in order to determine properties related to the miscibility condition for the reservoir fluid sample. In each of the steps 606, 608, 610, 616, and 618, the temperature of the fluids (solvent and sample fluid) in the microchannel 302 is controlled by maintaining the temperature of the microchannel 302 via temperature control of the temperature-controlled cooling/heating surface 305. The temperature is maintained substantially constant near the reservoir temperature, $T_{res}$. Temperature equilibration in the microchannel 302 can be achieved quickly due to the availability of relatively large surface area as well as relatively small fluid volume of the microchannel 302. During the operation of steps 606, 608, 610, 616, and 618, pressures P1, and P2 are measured, respectively, by the pressure sensors 312 and 314 and recorded by the computer processing system 422, and temperatures T1 and T2 are measured by the temperature sensors 414 and 416 and recorded by the computer processing system 422. Such pressures and temperatures can also be displayed on a graph relative to time for user evaluation, if desired. Such pressures and temperatures can also be stored in the memory system of the computer processing system 422 for automated data analysis, if desired.

Figure 7B:
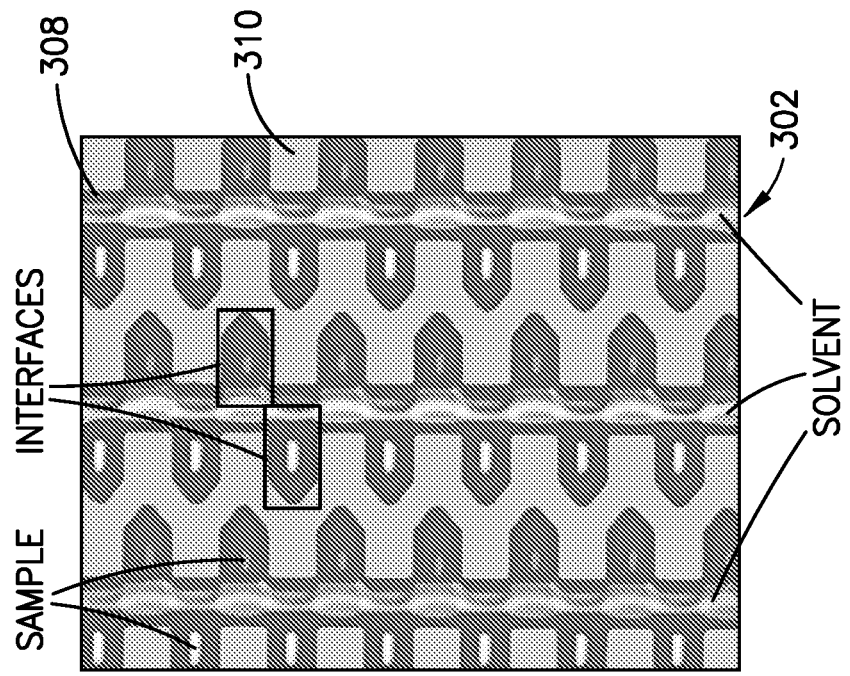
FIGS. 7A to 7D depict a microscopic image of a section of the microchannel at different stages of miscibility development.
Figure 7A:
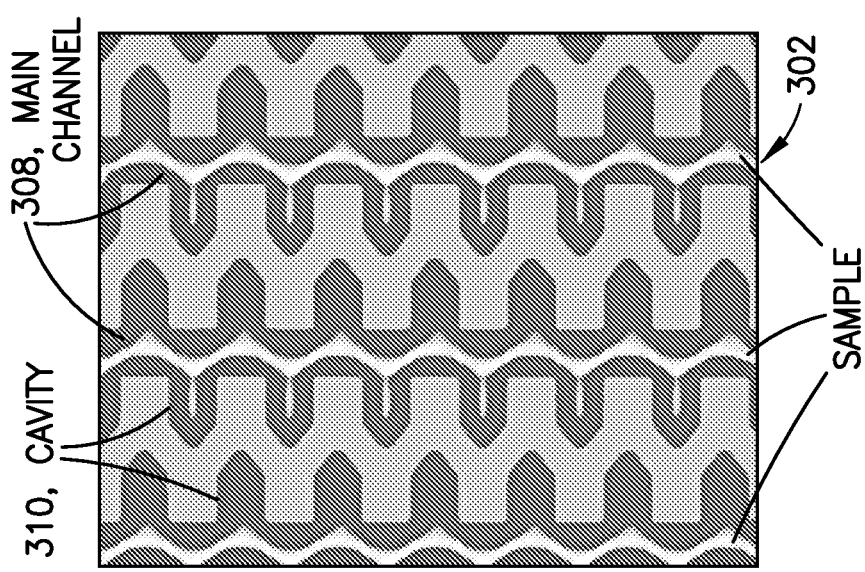
Figure 7D:
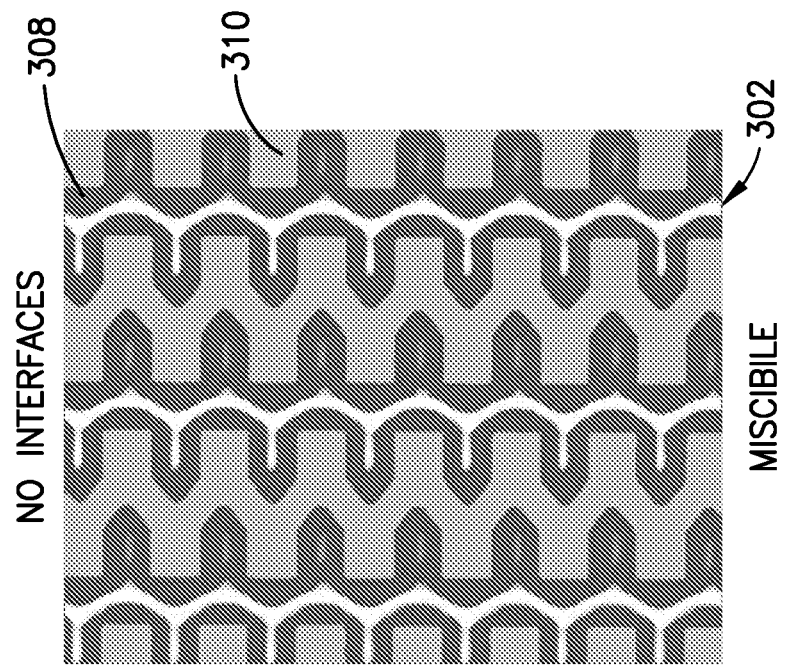
Figure 7C:
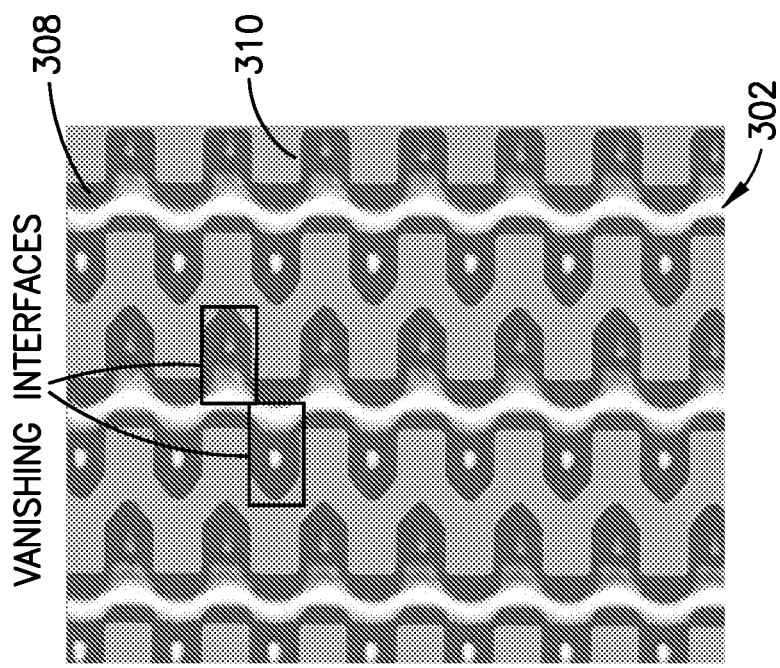

In step 610, the microchannel 302 can be visually monitored using images acquired by the image capture device 412, and real time image analysis performed by the computing processing system 422 and/or controller 420. FIG. 5 is a microscopic image of the microchannel 302 when it is empty of all fluids, showing the boundaries of the main channel 308 and the cavities 310. FIGS. 7A-7D show microscopic images of a section of the microchannel 302, near the middle thereof, at different stages of the workflow 600. FIG. 7A shows the channel 302 filled with sample fluid at steps 604 or 616. FIG. 7B shows that as the solvent stream passes through the channel 302, distinct interfaces are formed at the junction of the cavities 310 and the main channel 308, corresponding to steps 606 and 608. When the average pressure across the channel 302 reaches MMP (YES at step 610), the interface is seen receding rapidly into the cavities, as shown in FIG. 7C, until the interface vanishes completely as shown in FIG. 7D. The visual changes that occur from FIGS. 7A to 7D can be processed by the controller 420 and/or the computer processing system 422 to determine when MMP is reached. Two image processing methods are described below, which can both be performed automatically and in real-time.

Figure 8B:
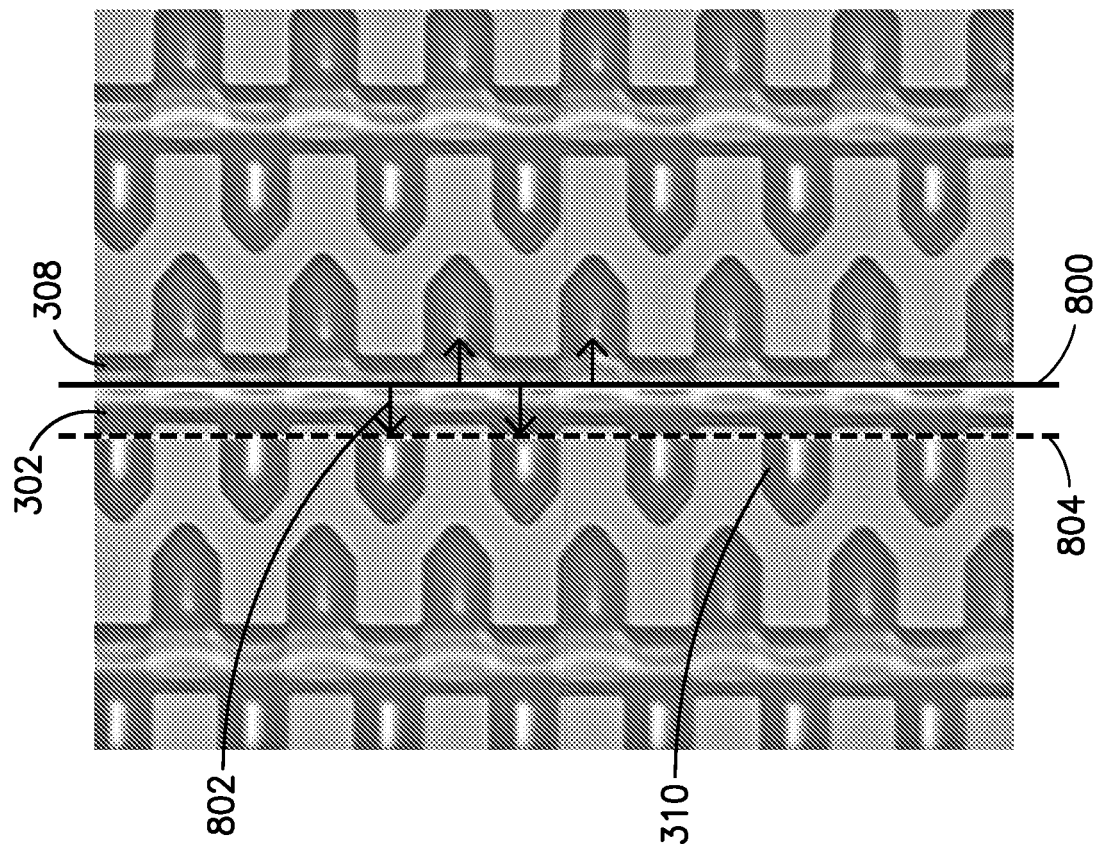
FIGS. 8A to 8C depict, respectively, the images in FIGS. 7A to 7C with overlaid images.
Figure 8A:
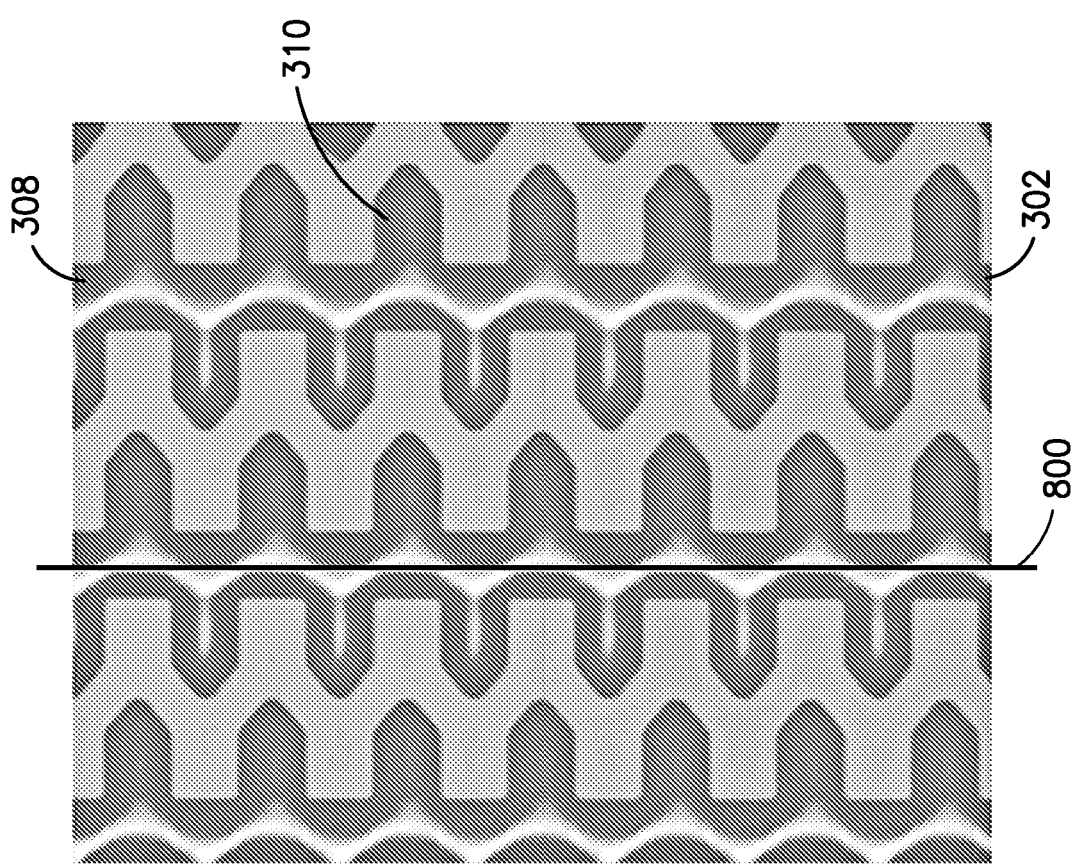
Figure 8C:
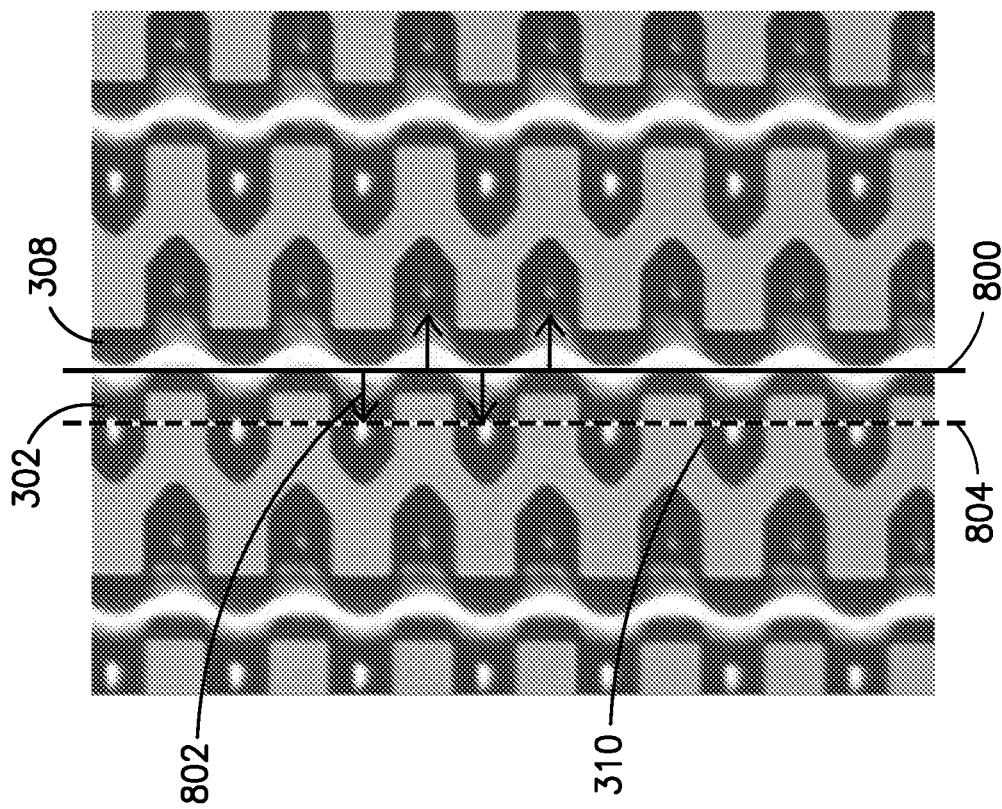

In a first method, the image in FIG. 7A is overlaid with a reference line 800 positioned in the center of the microchannel 302 as shown in FIG. 8A. Then, as the solvent is introduced and flows through the main channel 308, a lateral distance ($d_{interface}$) 802 is measured from the reference line to the interface between the solvent and the sample fluid, as shown by the dotted lines 804 in FIG. 8B, which corresponds to the interfacial mixture in FIG. 7B. As pressure is increased and the miscibility condition is approached at a given pressure, the interface moves rapidly further away from the reference line 800 into the cavities 310 as the interfaces vanish. Hence, the distance of the interface ($d_{interface}$) 802 from the main reference line increases, as shown in FIG. 8C, which is an overlay of FIG. 7C. When the interfaces vanish completely, miscibility is achieved, and the distance of the interface ($d_{interface}$) becomes equal to the length of the cavities 310.

In one embodiment, the computing processing system 422 can be configured to process a sequence of acquired images to apply the overlays as described above to identify the interface between solvent and sample fluid to track the distance of the interface ($d_{interface}$) over time while the front moves from the inlet 304 to the outlet 306. In one embodiment, the distance of the interface ($d_{interface}$) is compared against a known fixed distance measured between the reference line to the end of the cavity 310. If the measured distance of the interface ($d_{interface}$) is greater than or equal to a certain percentage of the known fixed distance, it may be automatically determined that miscibility has been reached.

Figure 9A:
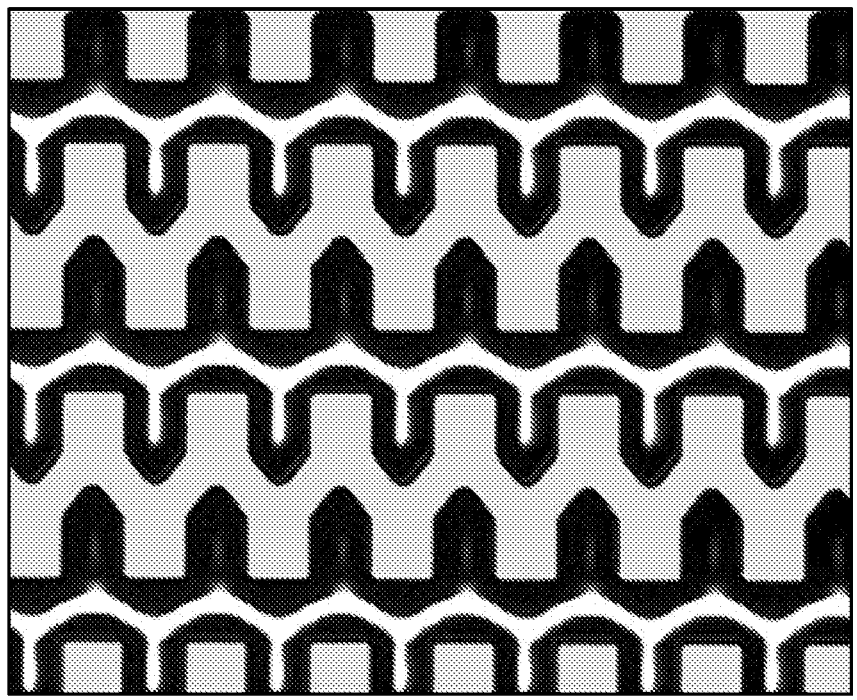
FIG. 9A depicts an enhanced version of the image in FIG. 7A.
Figure 9C:
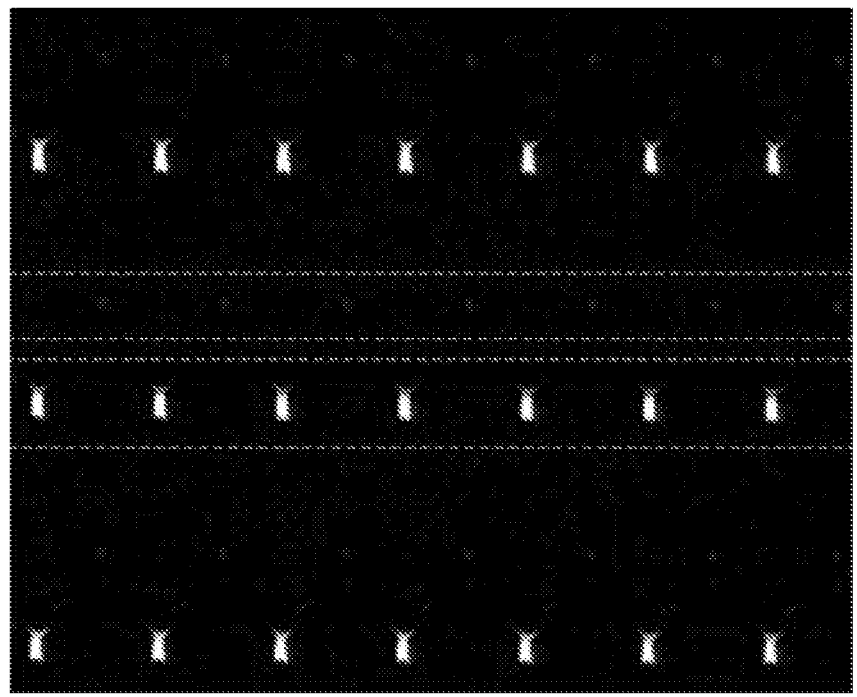
FIG. 9C depicts an image derived from the subtraction of the image in FIG. 9A from the image in FIG. 9B.
Figure 9B:
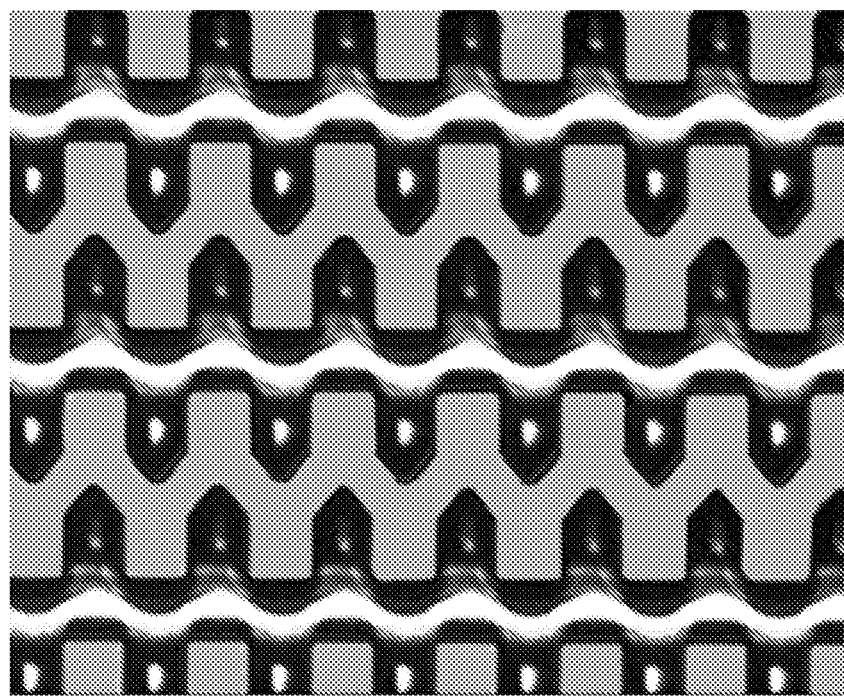
FIG. 9B depicts an enhanced version of the image in FIG. 7C.

A second method of visually determining that the miscibility condition has been reached is by using an image comparison or photo matching algorithm. For example, the image of the portion of the chip 300 where no interface is established (i.e., FIG. 7A) may be used as a reference image to compare a series of subsequently obtained images (e.g., FIGS. 7B and 7C) obtained by the image acquisition device 412 after solvent introduction. The acquired images (e.g., FIGS. 7A, 7B, and 7C) may be greyscale and may be image processed to enhanced contrast and sharpness. FIG. 9A shows the image of FIG. 7A after the image of FIG. 7A has been processed to enhance contrast and sharpness. Various methods of image processing may be used. For example, an image processing software such as "ImageJ" may be used to convert an acquired image to an 8-bit image, which can be further processed to enhance contrast. By way of example, an 8-bit image can be enhanced using "ImageJ" by setting the saturated pixel setting to 0.4% and equalizing the histogram. The other images, such as FIGS. 7B and 7C, which do show interfaces, can also likewise be enhanced in the same manner as FIG. 7A. FIG. 9B shows the image of FIG. 7C with enhanced contrast and sharpness. Then, the image in FIG. 9A can be used as a reference image which can be subtracted from the enhanced image that shows the presence of interfaces (e.g., FIG. 9B) to generate another image (a difference image), shown in FIG. 9C, which can be used to identify whether there are any interfaces inside the cavities 310. In FIG. 9C, the bright white spots show that interfaces still exist at the time the image of FIG. 7C was acquired, and, thus, that miscibility has not been achieved. However, when the resulting difference image is substantially uniform in color (e.g., when white spots are absent), it can be determined that no interfaces exist, and, thus, that the miscibility condition has been achieved.

The test system 400 and workflow 600 were verified by testing a known sample fluid having well-known miscibility with $CO_2$. The sample fluid chosen was a synthetic oil mixture of Methane (27 mol %), Butane (23 mol %), and Decane (50 mol %). Miscibility of $CO_2$ in this synthetic mixture has been studied in the literature (See Metcalfe, R. S. and L. Yarborough (1979). "The Effect of Phase Equilibria on the CO2 Displacement Mechanism." Society of Petroleum Engineers Journal 19(4): 242-252 and Yellig, W. F. and R. S. Metcalfe (1980). "Determination and Prediction of CO2 Minimum Miscibility Pressures (includes associated paper 8876)." Journal of Petroleum Technology 32(1): 160-168 and Ayirala, S. C., W. Xu, et al. (2006). "Interfacial behaviour of complex hydrocarbon fluids at elevated pressures and temperatures." Canadian Journal of Chemical Engineering 84(1): 22-32.). The MMP value reported in the literature was 1150 psig. The test was conducted to determine MMP of $CO_2$ in the synthetic oil at 35° C. The workflow followed the workflow 600 in FIG. 6.

To measure the MMP, the microchannel 302 was initially filled with the oil at 35° C. Then, the $CO_2$ solvent was injected into the channel. A controlled pressure drop ($\approx$50 psi) was created across the channel 302 to ensure that the $CO_2$ front moved slowly through the oil filled channel 302. FIGS. 7A-7D show photographs of a section of the channel 302 near the middle of the channel, at different stages of the workflow 600. Initially, the channel 302 is filled with the oil as shown in FIG. 7A. As the $CO_2$ stream passes through the channel 302, distinct interfaces are formed at the junction of the cavities 310 and the main channel 308, as shown in FIG. 7B. When the test pressure reaches MMP, the interface was seen receding rapidly into the cavities (FIG. 7C) until the interface vanished completely (FIG. 7D).

By recording the average pressure [(P1+P2)/2] in the channel and monitoring the gas-liquid interfaces, as discussed above, the MMP can be measured accurately. For the synthetic oil sample, the measured MMP for $CO_2$ was 1220±25 psig at 35° C.

The above-described experimental apparatus, methods, and systems provide various benefits, some of which include: rapid, repeatable measurement of MMP or MMC; lab quality data; small sample volume; operator independent; potential for automation; and suitable for wellsite and downhole environment.

Although only a few examples have been described in detail above, those skilled in the art will readily appreciate that many modifications are possible in the examples without materially departing from this subject disclosure. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112 (f) for any limitations of any of the claims herein, except for those in which the claim expressly uses the words 'means for' together with an associated function.

What is claimed is:

1. A microfluidic system for determining miscibility of a solvent in a sample reservoir fluid, the system comprising:
   a microfluidic apparatus for determining miscibility of a solvent in a reservoir fluid, the apparatus comprising: a substrate defining a microchannel extending along a length from an inlet to an outlet, the microchannel having an elongated main channel extending from the inlet to the outlet and having a series of cavities extending outward from the main channel, the cavities spaced from one another along the length of the microchannel, the cavities being in fluid communication with the main elongated channel, wherein the microchannel is configured to receive and fill with a reservoir fluid and the cavities are configured to retain the reservoir fluid when reservoir fluid in the main channel is displaced by the solvent, thereby permitting solvent flowing in the main channel from the inlet to the outlet to serially contact the retained reservoir fluid in each cavity;
   a first fluid introduction device to introduce a sample fluid into the microchannel through the inlet;
   a second fluid introduction device configured to introduce a solvent into the microchannel through the inlet after the sample fluid is introduced into the microchannel;
   a pressure controller configured to control an inlet pressure of solvent flowing through the microchannel at the inlet of the microchannel;
   at least one pressure sensor coupled to the microchannel and configured to measure at least one of an inlet pressure and outlet pressure of solvent flowing in the microchannel;
   an image capture device configured to capture a series of images of at least a portion of the microchannel as a front of the solvent moves through the microchannel from the inlet to the outlet of the microchannel; and
   an image processing device configured to process a plurality of the series of images and, based on a comparison of the processed images, determine whether a miscibility condition has been reached.

2. The system according to claim 1, wherein the at least one pressure sensor includes an inlet pressure sensor coupled to the microchannel and configured to measure fluid pressure in the microchannel at or near the inlet of the microchannel; and an outlet pressure sensor coupled to the microchannel and configured to measure fluid pressure in the microchannel at or near the outlet of the microchannel.

3. The microfluidic apparatus of claim 1, wherein the cavities extend at a non-zero angle relative to a central axis extending along the length of the main channel.

4. The microfluidic apparatus of claim 1, wherein the cavities are distributed along the main microchannel.

5. The microfluidic apparatus of claim 1, wherein the microchannel is generally linear along its length.

6. The microfluidic apparatus of claim 1, wherein the microchannel is generally serpentine shaped along its length.

7. The microfluidic apparatus of claim 1, wherein each cavity has an open end at a wall of the main channel, and has sides extending outwardly from the main channel that extend to a closed, tapered end.

8. The microfluidic apparatus of claim 1, wherein the cavities are symmetrically aligned across the main channel.

9. The microfluidic apparatus of claim 1, wherein the cavities are asymmetrically aligned across the main channel.

\* \* \* \* \*